(12) United States Patent
Hayashizaki

(10) Patent No.: US 8,856,762 B2
(45) Date of Patent: Oct. 7, 2014

(54) LOOP DETECTION APPARATUS, LOOP DETECTION METHOD, AND LOOP DETECTION PROGRAM

(75) Inventor: Hiroshige Hayashizaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/301,099

(22) Filed: Nov. 21, 2011

(65) Prior Publication Data

US 2012/0137111 A1 May 31, 2012

(30) Foreign Application Priority Data

Nov. 30, 2010 (JP) .................................. 2010-266642

(51) Int. Cl.
*G06F 9/45* (2006.01)
*G06F 11/28* (2006.01)
(52) U.S. Cl.
CPC ...................................... *G06F 11/28* (2013.01)
USPC .......................................... 717/151; 717/160
(58) Field of Classification Search
None
See application file for complete search history.

(56) References Cited

U.S. PATENT DOCUMENTS 6,751,789 B1 * 6/2004 Berry et al. ................... 717/130

OTHER PUBLICATIONS

Vasanth Bala et al., "Dynamo: A Transparent Dynamic Optimization System," ACM SIGPLAN Notices, vol. 35, pp. 1-12, Can 2000.
Andreas Gal et al., "Trace-based just-in-time type specialization for dynamic languages," In Programming Languages Design and Implementation, pp. 1-11, ACM, 2009.
David Hinikeret et al., "Improving Region Selection in Dynamic Optimization Systems," Proceedings of the 38th annual IEEE/ACM International Symposium on Microarchitecture, pp. 141-154, Nov. 12-16, 2005.
Andreas Gal et al., "Incremental Dynamic Code Generation with Trace Trees," Technical Report, pp. 6-16, Donald Bren School of Information and Computer Science, University of California, Irvine, Nov. 2006.
Duane Merrill et al., "Trace Fragment Selection within Method-based JVMs," In Proceedings of the International Conference on Virtual Execution Environments, ACM Press, pp. 41-50, 2008.

* cited by examiner

*Primary Examiner* — Qamrun Nahar
(74) *Attorney, Agent, or Firm* — Vazken Alexanian

(57) ABSTRACT

A loop detection method, system, and article of manufacture for determining whether a sequence of unit processes continuously executed among unit processes in a program is a loop by means of computational processing performed by a computer. The method includes: reading address information on the sequence of unit processes; comparing an address of a unit process as a loop starting point candidate with an address of a last unit process in the sequence of unit processes; reading call stack information on the sequence of unit processes; comparing a call stack upon execution of the unit process as the loop starting point candidate with a call stack upon execution of the last unit process; outputting a determination result indicating that the sequence of unit processes forms a loop if the respective comparison results of the addresses and the call stacks match with each other.

20 Claims, 16 Drawing Sheets

| TRACE | FIRST METHOD OF TRACE (HEAD OF TRACE) | RETURN FROM FIRST METHOD OF TRACE | DETERMINATION RESULTS BY CONVENTIONAL METHOD | FIRST METHOD OF LOOP (HEAD OF LOOP) | RETURN FROM FIRST METHOD OF LOOP | DETERMINATION RESULTS BY PRESENT INVENTION |
|---|---|---|---|---|---|---|
| G-B-G ⇐ | g(G) | G→B | FALSE LOOP | g(G) | G→B | FALSE LOOP |
| A-G-B-G ⇐ | f(A) | None | LOOP | g(G) | G→B | FALSE LOOP |
| A-G-B-G-C-A ⇐ | f(A) | None | LOOP | f(A) | None | LOOP |
| G-B-G-C-A-G ⇐ | g(G) | G→B | FALSE LOOP | g(G) | G→B | FALSE LOOP |

FIG. 10A

```
1 f(){
2   while(A){
3     g(); B;
4     g(); C;
5   }
6 }
7 g(){
8   G;
9 }
```

FIG. 10B

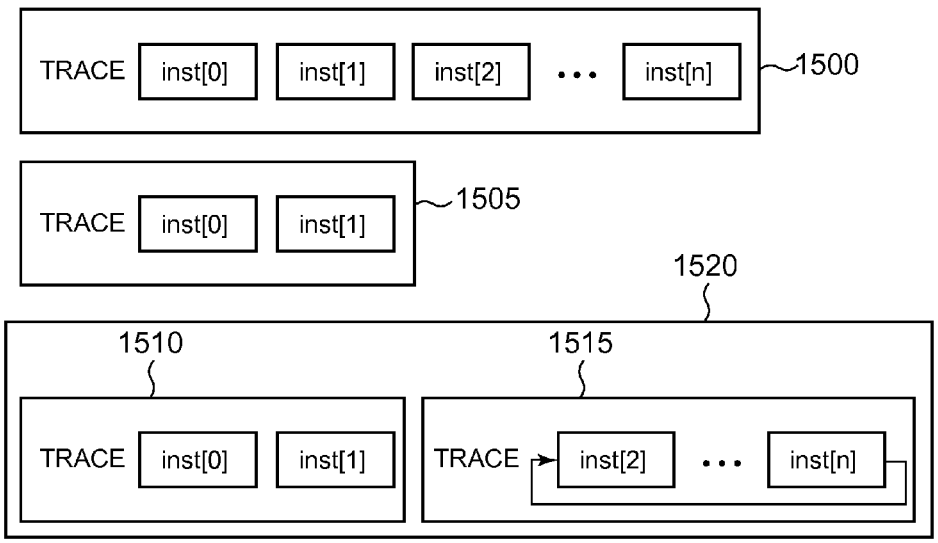

FIG. 15

|  |  | G-B-G | A-G-B-G | A-G-B-G-C-A | Non-loop trace with return from head | G-B-G-C-A-G |
|---|---|---|---|---|---|---|
| RELATED ART | No FLF | LOOP | LOOP | LOOP | PERMITTED | LOOP |
|  | FLF no return TRACE | FALSE LOOP | LOOP | LOOP | PROHIBITED | FALSE LOOP |
| PRESENT INVENTION | FLF no return LOOP | FALSE LOOP | FALSE LOOP | LOOP | PERMITTED | FALSE LOOP |
|  | FLF call stack | FALSE LOOP | FALSE LOOP | LOOP | PERMITTED | LOOP |
|  | FLF two iterations | FALSE LOOP | FALSE LOOP | LOOP | PERMITTED | LOOP |
|  | DESIRED DETERMINATION | FALSE LOOP | FALSE LOOP | LOOP | PERMITTED | LOOP (PREFERRED) |

FIG. 16

LOOP DETECTION APPARATUS, LOOP DETECTION METHOD, AND LOOP DETECTION PROGRAM

CROSS-REFERENCE TO RELATED APPLICATION

This application claims priority under 35 U.S.C. §119 from Japanese Patent Application No. 2010-266642 filed Nov. 30, 2010 the entire contents of which are incorporated herein by reference.

BACKGROUND OF THE INVENTION

1. Field of the Invention

The present invention relates to tracing technology, and more particularly to a technique for detecting a loop to generate a trace.

2. Related Art

Recently, importance has been given to tracing technology in processing systems for performing dynamic compilation or binary translation (for example, see Vasanth Bala et al., "Dynamo: A Transparent Dynamic Optimization System," ACM SIGPLAN Notices, Volume 35, pp. 1-12, Can 2000; and Andreas Gal et al., "Trace-based just-in-time type specialization for dynamic languages," In Programming Languages Design and Implementation, pp. 1-11, ACM, 2009 The tracing technology is a technique for extracting a code path repeatedly passed through during execution of a program, and recording and compiling the trajectory, i.e., the trace thereof to generate fast code.

According to the tracing technology, since only the code actually executed is optimized, problems in conventional compilation techniques used in units of functions (or methods or procedures, hereinafter the same shall apply), such as that actually unused code is optimized and that optimization across functions cannot be achieved or is difficult if it is performed over multiple stages, can be solved or reduced.

Among various compilation methods used in units of traces, the most basic method is practiced as follows: First, source code is converted to intermediate code such as byte code. Next, an interpreter executes the intermediate code and monitors the execution. When a backward branch is detected, the destination of the branch is recorded as a loop starting point candidate. This is because loop processing always involves a backward branch, but the loop starting point candidate can be created on any condition other than the destination of the backward branch. Then, when it is detected that a code path starting with the loop starting point candidate is executed repeatedly predetermined times or more, executed intermediate code (trace) is recorded, and the recorded trace is optimized and compiled to generate native code.

The generated native code is executed directly by the system as long as the same path as the original trace is selected. However, when the precondition is not satisfied, such as, when the results of conditional branching are different, control is returned to the interpreter or shifted to native code generated from another trace. The cost of switching to the interpreter or transition to another trace is high, and this can cause a runtime overhead. Therefore, it is important to detect a loop correctly to generate a trace not to cause switching to the interpreter or transition to another trace frequently.

David Hinikeret et al., "Improving Region Selection in Dynamic Optimization Systems," Proceedings of the 38th annual IEEE/ACM International Symposium on Microarchitecture, pp. 141-154, Nov. 12-16, 2005 discloses a technique for determining a sequence of instructions to be a loop on condition that the addresses of the first instruction and the last instruction in the sequence of instructions are the same.

Andreas Gal et al. discloses an "Incremental Dynamic Code Generation with Trace Trees," Technical Report, pp. 6-16, Donald Bren School of Information and Computer Science, University of California, Irvine, November 2006, and Duane Merrill et al., "Trace Fragment Selection within Method-based JVMs," In Proceedings of the International Conference on Virtual Execution Environments, ACM Press, pp. 41-50, 2008 disclose techniques for prohibiting the generation of a trace including a return instruction from a method to which the first instruction of the trace belongs.

Note that Vasanth Bala et al., "Dynamo: A Transparent Dynamic Optimization System," ACM SIGPLAN Notices, Volume 35, pp. 1-12, Can 2000, mentioned above, is listed as a conventional call stack constructing technique for emulating push/pop operations on a call stack to construct the call stack at the time of each instruction.

U.S. Pat. No. 6,751,789 discloses a "Method and System For Periodic Sampling For Real-Time Generation of Segments of Call Stack Trees Augmented With Call Stack Position Determination."

Duane Merrill et al. disclose a "Trace Fragment Selection within Method-based JVMs," In Proceedings of the International Conference on Virtual Execution Environments, ACM Press, pp. 41-50, 2008.

SUMMARY OF THE INVENTION

One aspect of the present invention includes a loop detection method for determining whether a sequence of unit processes continuously executed among unit processes in a program is a loop by means of computational processing performed by a computer. The method includes the steps of: reading address information on the sequence of unit processes from a storage section of the computer, comparing an address of a unit process as a loop starting point candidate with an address of a last unit process in the sequence of unit processes, reading call stack information on the sequence of unit processes from the storage section of the computer, comparing a call stack upon execution of the unit process as the loop starting point candidate with a call stack upon execution of the last unit process, and outputting a determination result indicating that the sequence of unit processes forms a loop if the respective comparison results of the addresses and the call stacks match with each other, where at least one step is carried out by the computer.

Another aspect of the invention includes an article of manufacture tangibly embodying computer readable instructions which, when implemented, cause a computer to carry out the steps of the method provided in the preceding paragraph.

Yet another aspect of the invention includes a loop detection apparatus for determining whether a sequence of unit processes continuously executed among unit processes in a program forms a loop. The apparatus includes: a storage unit for storing address information and call stack information on the sequence of unit processes, an address comparing unit for reading the address information on the sequence of unit processes from the storage section and comparing an address of a unit process as a loop starting point candidate with an address of a last unit process in the sequence of unit processes, a call stack comparing unit for reading the call stack information on the sequence of unit processes from the storage section and comparing a call stack upon execution of the unit process as the loop starting point candidate with a call stack upon execution of the last unit process, and an output unit for outputting a determination result indicating that the sequence of unit processes forms a loop if respective comparison results of the addresses and the call stacks match with each other.

Still another aspect of the invention includes a loop detection apparatus for determining whether a sequence of unit processes continuously executed among unit processes in a program forms a loop. The apparatus includes: a storage unit for storing address information and type information on each of the unit processes in the sequence of unit processes, an address comparing unit for reading the address information on the sequence of unit processes from the storage section and comparing an address of a unit process as a loop starting point candidate with an address of a last unit process in the sequence of unit processes, a call stack constructing unit for reading the type information and address information on the unit processes from the storage section and constructing a call stack upon execution of the unit process as the loop starting point candidate and a call stack upon execution of the last unit process, a call stack comparing unit for comparing the call stack upon execution of the unit process as the loop starting point candidate with the call stack upon execution of the last unit process, and an output unit for outputting a determination result indicating that the sequence of unit processes forms a loop if the respective comparison results of the addresses and the call stacks match with each other.

BRIEF DESCRIPTION OF THE DRAWINGS

FIG. 10 is a table showing the results of comparison between loop determination results by the present invention (second embodiment) and a conventional technique.

FIG. 15 is a diagram showing an example of traces generated based on loop determination results.

FIG. 16 is a table showing the results of comparison between loop determination results by the conventional technique and the present invention.

DETAILED DESCRIPTION OF THE PREFERRED EMBODIMENTS

Figures 1A, 1B:
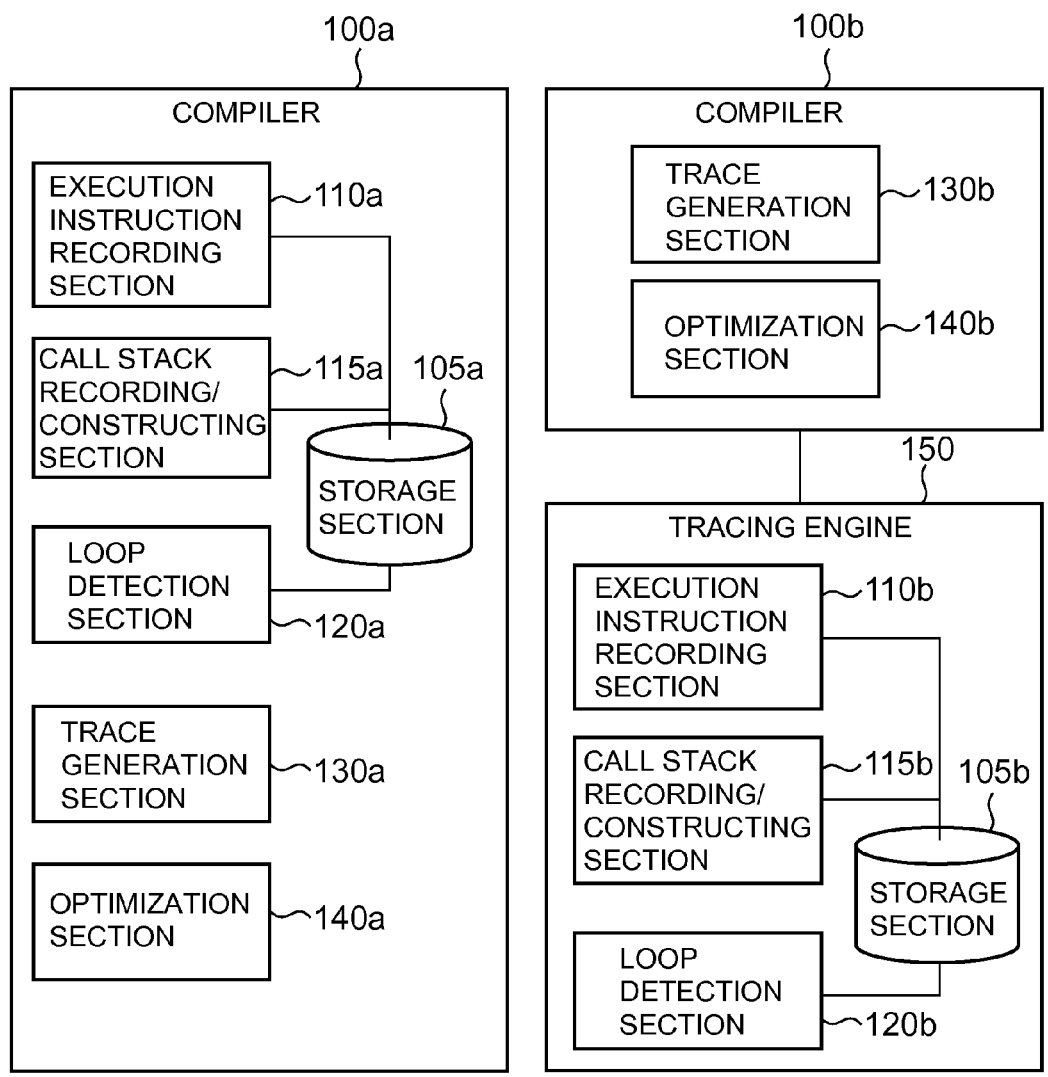
FIG. 1(A) shows one implementation of a loop detection apparatus according to the present invention.
FIG. 1(B) shows another implementation of the loop detection apparatus according to the present invention.

The loop detection technique disclosed in David Hinikeret et al can cause a problem of determining, to be a loop, a false loop that is not naturally a loop. For example, suppose that recording of execution instructions starts with instruction G executed by calling function g on the third line in code shown in FIG. 10B. In this case, the sequence of instructions G-B-G is recorded, since the address of the first G is the same as the address of the last G in the sequence of instructions G-B-G, and the sequence of instructions G-B-G is determined to be a loop.

However, since instruction C is actually executed following the second instruction G in G-B-G, the sequence of instructions G-B-G is not repeatedly executed, and hence the sequence of instructions G-B-G is a false loop. Thus, when a loop is determined on condition of matching of addresses only, a problem arises that a false loop can be detected.

On the other hand, according to the techniques disclosed in Andreas Gal et al. and Duane Merrill et al., since the above-mentioned sequence of instructions G-B-G includes a return instruction from function g, to which the first instruction G belongs, to function f to which instruction B belongs, the generation of the sequence of instructions G-B-G as a trace is prohibited, and as a result, the detection of a false loop can be eliminated.

However, since the above technique in Duane Merrill et al. is not to detect the sequence of instructions G-B-G as a false loop, the generation of a sequence of instructions A-G-B-G is, for example, permitted based on the determination that the sequence of instructions G-B-G is a loop.

Although the sequence of instructions G-B-G is a false loop, a sequence of instructions G-B-G-C-A-G obtained as a result of carrying on with recording of execution instructions is a true loop because it can be repeatedly executed. It is preferred to generate a long trace not only because it reduces the runtime overhead but also because it leads to effective optimization.

However, according to the techniques disclosed in Andreas Gal et al. and Duane Merrill et al., since the sequence of instructions G-B-G-C-A-G includes a return instruction from function g, to which the first instruction G belongs, to function f to which instruction B belongs, the generation of the sequence of instructions G-B-G-C-A-G as a trace is prohibited.

This invention has been made to solve the above problems, and it is an object thereof to provide a loop detection technique in the tracing technology capable of eliminating erroneous detection of a false loop and preventing a true loop including a long trace from rejecting.

In order to solve the above problems, according to a first aspect of the present invention, there is provided a loop detection method for determining, by means of computational processing performed by a computer, whether a sequence of unit processes continuously executed among unit processes in a program is a loop, the computer including: a step of reading address information on the sequence of unit processes from a storage section of the computer and comparing the address of a unit process as a loop starting point candidate with the address of the last unit process in the sequence of unit processes; a step of reading call stack information on the sequence of unit processes from the storage section of the computer and comparing a call stack upon execution of the unit process as the loop starting point candidate with a call stack upon execution of the last unit process; and a step of outputting a determination result indicating that the sequence of unit processes forms a loop on condition that the respective comparison results of the addresses and the call stacks match with each other.

It is preferred that the comparison between the call stacks be a comparison between return addresses in respective stack frames that construct the call stacks.

It is more preferred that the comparison between the return addresses in the respective stack frames be a comparison between respective return addresses from a stack frame last stacked to the k-th stack frame (where k is a given positive integer).

It is further more preferred that if the depth of the shallowest call stack in call stacks upon execution of respective unit processes in the sequence of unit processes is denoted by m, the depth of the call stack upon execution of the unit process as the loop starting point candidate is denoted by $k_1$, and the depth of the call stack upon execution of the last unit process is denoted by $k_2$, the given positive integer k should be calculated as a smaller value between the value obtained by subtracting m from $k_1$ and the value obtained by subtracting m from $k_2$.

It is also preferred that the above loop detection method be such that the computer further includes a step of reading type information and address information on unit processes in the sequence of unit processes from the storage section of the computer, constructing a call stack upon execution of the unit process as the loop starting point candidate and a call stack upon execution of the last unit process, and storing the call stacks in the storage section as information on the call stacks.

It is more preferred that the type information on unit processes is information indicating that each unit process be one of a unit process on a caller side, a unit process on a callee side, and any other unit process.

It is further more preferred that the construction of each call stack should include e a step of referring to the type information and address information on the unit processes in the sequence of unit processes to create a branched linked list, each node of which represents a stack frame and has data fields for recoding a return address in the stack frame and reference (link) to a node representing the previous stack frame of the stack frame, whereby a call stack upon execution of any unit process in the sequence of unit processes is constructed by tracing back nodes of previous stack frames sequentially from a node representing a stack frame corresponding to the unit process based on the reference and connecting return addresses of the nodes tracked back.

Further, it is preferred that the unit process be an instruction, a basic block, or a branch instruction.

Further, it is preferred that the above loop detection method be such that the computer further includes a step of deciding on each unit process in the sequence of unit processes sequentially as a unit process of the loop starting point candidate and executing each step repeatedly each time the unit process is decided on.

Further, it is preferred that the above loop detection method be such that the computer should further include a step of executing a step of counting the number of executions of each process, a step of starting recording of the sequence of unit processes into the storage section of the computer when the number of executions reaches a predetermined value, and a step of generating, optimizing, and compiling a trace of the sequence of unit processes based on a determination in response to output of the determination that the sequence of unit processes forms a loop.

While the present invention is described above as the loop detection method, the present invention can also be understood as a loop detection program causing a computer to practice the loop detection method, and a loop detection apparatus implemented by a computer on which the loop detection program is installed.

According to the present invention, in determining whether a sequence of unit processes continuously executed is a loop, a match between call stacks upon execution of a unit process as a loop starting point candidate and the last unit process is added as a condition in addition to an address match between the unit process as the loop starting point candidate and the last unit process in the sequence of unit processes, and this can prevent an error in the detection of a true loop while eliminating erroneous detection of a false loop properly.

The other advantages of the present invention will be understood from the description of preferred embodiments.

Modes for carrying out the present invention will now be described in detail with reference to the accompanying drawings. Note that the following embodiments are not intended to limit the inventions according to the appended claims, and not all the combinations of features described in the embodiments are requisites as resolving means of the inventions.

FIG. 1A is a diagram showing one implementation of a loop detection apparatus according to the present invention. In the implementation shown in FIG. 1A, the loop detection apparatus according to the present invention is implemented as one function (loop detection section 120a) of a compiler 100a for trace-based compilation.

The compiler 100a includes a storage section 105a (buffer), an execution instruction recording section 110a, a loop detection section 120a, a trace generation section 130a, and an optimization section 140a to detect a code path, or a loop, repeatedly passed through during execution of a program, and generate and optimize a trace based on the loop information in order to generate fast native code. The compiler 100a can optionally include a call stack recording/constructing section 115a as well.

FIG. 1B is a diagram showing another implementation of the loop detection apparatus according to the present invention. In the implementation shown in FIG. 1B, the loop detection apparatus according to the present invention is implemented as one function (loop detection section 120b) of a tracing engine 150 attached to a compiler 100b for trace-based compilation.

In this embodiment, recording of a sequence of continuous unit processes frequently executed and optional recording or construction of call stack information during execution of a sequence of unit processes are functions of the tracing engine 150, and an execution instruction recording section 110b and a call stack recording/constructing section 115b as an option are provided inside the tracing engine. Though not shown, the loop detection apparatus according to the present invention can further be implemented as hardware in a processor.

Thus, though the implementations are different, each component and its function in the respective implementations are the same. Therefore, the following will describe each component according to the implementation shown in FIG. 1A.

The execution instruction recording section 110a monitors the frequency of execution of each unit process in a program to be optimized and records a sequence of continuous unit processes frequently executed.

Specifically, the execution instruction recording section 110a counts the number of executions of each unit process in the program to be optimized, and starts recording of the sequence of frequently executed unit processes into the storage section 105a (buffer) when the number of executions reaches a predetermined threshold value.

After starting the recording, the execution instruction recording section 110a requests the loop detection section 120a to be described later to make a loop determination on the sequence of unit processes in the storage section 105a (buffer). Then, for example, when a predetermined condition for terminating instruction recording is satisfied, such as when a loop is detected or the buffer is filled up, the execution instruction recording section 110a terminates the recording.

Here, each unit process in the program to be optimized can be one instruction, a basic block, or a branch instruction. The basic block denotes a set of instructions in which instructions other than the first executed instruction and the last executed instruction are neither branch instructions nor branch destination instructions.

Further, information to be recorded in the storage section 105a (buffer) by the execution instruction recording section 110a includes the type of each unit process and its address information. Here, the type of each unit process can be information indicating that the unit process is one of a unit process on a caller side, a unit process on a callee side, and any other unit process. For example, when the unit process is one instruction, the type of each unit process can be information indicative of any of a call instruction (method call), a return instruction (method return), and an instruction other than the call instruction and the return instruction.

When the unit process is a basic block, the type of each unit process can be information indicating that the last instruction in the basic block is any one of the call instruction (method call), the return instruction (method return), and an instruction other than the call instruction and the return instruction. Further, when the unit process is a branch instruction, the type of each unit process can be information indicating that the branch instruction is any one of the call instruction (method call), the return instruction (method return), and an instruction other than the call instruction and the return instruction.

When the loop detection section 120a to be described later does not have the function of constructing a call stack, the optional call stack recording/constructing section 115a is provided in the compiler 100a. When the call stack recording/constructing section 115a functions as a call stack recording section, it records, in the storage section 105a (buffer), call stack information upon execution of a unit process to be recorded when the execution instruction recording section 110a starts recording the sequence of unit processes. The call stack information recorded in the storage section 105a (buffer) by the call stack recording/constructing section 115a is a return address in each of stack frames constructing a call stack or a stack pointer.

On the other hand, when the call stack recording/constructing section 115a functions as a call stack constructing section, it refers to the type of each unit process and its address stored in the storage section 105a (buffer) to construct a call stack before the loop detection section 120a to be described later starts processing. To be more specific, the call stack recording/constructing section 115a constructs a return address in each of stack frames that constructing a call stack. Note that the call stack can be constructed by the loop detection section 120a to be described later, and the details thereof will be described later in connection with the loop detection section 120a.

In response to a loop determination request from the execution instruction recording section 110a, the loop detection section 120a makes a loop determination on the sequence of unit processes in the storage section 105a (buffer). Specifically, the loop detection section 120a reads address information and call stack information from the storage section 105a (buffer), and outputs a determination that the sequence of unit processes forms a loop on condition that respective addresses of a unit process as a candidate for the loop starting point and the last unit process in the sequence of unit processes match with each other, and that a call stack upon execution of the unit process as the candidate for the loop starting point and a call stack upon execution of the last unit process match with each other. The details of the function of the loop detection section 120a will be described later with reference to FIG. 2.

The trace generation section 130a generates a trace based on the sequence of unit processes as the loop detected by the loop detection section 120a. The optimization section 140a optimizes the generated trace and outputs the optimized trace as a compiled program.

Figure 2:
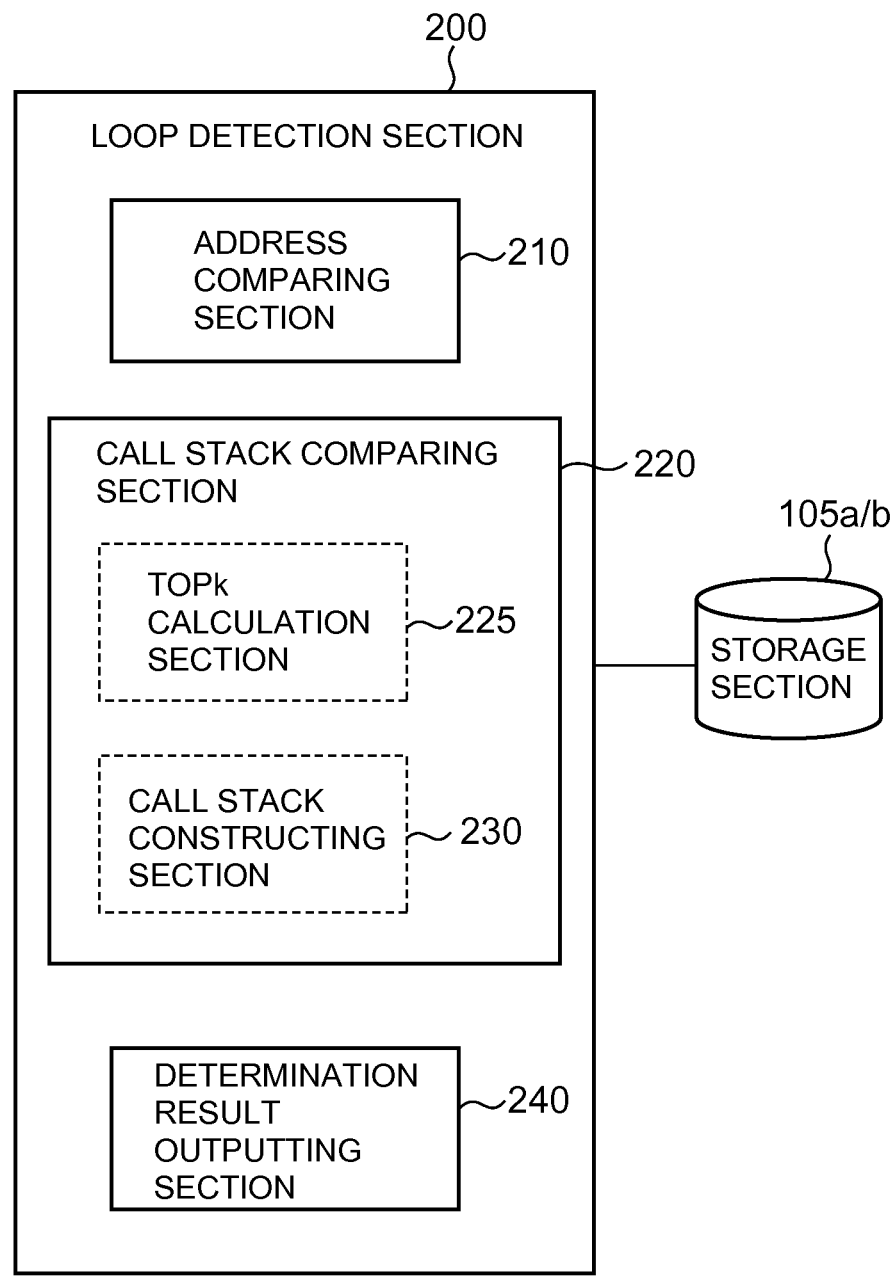
FIG. 2 is a functional block diagram of a loop detection section 200 according to a first embodiment of the present invention.

FIG. 2 is a functional block diagram of a loop detection section 200 according to a first embodiment of the present invention. The loop detection section 200 according to the first embodiment includes an address comparing section 210, a call stack comparing section 220, and a determination result outputting section 240. The loop detection section 200 is connected to the storage section 105a/b (buffer) for storing information on a sequence of unit processes whose number of executions is equal to or more than the predetermined threshold value as described with reference to FIG. 1. In the following description, it is assumed that each unit process is one instruction.

The address comparing section 210 reads address information on a sequence of instructions from the storage section 105a/b (buffer) in response to receiving a request for a loop determination in the loop detection section 200, and compares respective addresses of an instruction as a candidate for the loop starting point and the last instruction in the sequence of instructions. If the sequence of instructions stored in the storage section 105a/b (buffer) is a sequence of instructions consisting of n+1 instructions and the sequence of instructions is expressed in an array of structures inst[0 ... n] having types of instructions and their addresses as members, the instruction for the loop starting point candidate is expressed as inst[s] (where s is any non-negative integer that meets the relation $0 \leq s < n$, hereinafter the same shall apply).

The comparison result of the addresses of inst[s] and inst [n] made by the address comparing section 210 is passed to the call stack comparing section 220 and the determination result outputting section 240 together with position information s on the starting point candidate.

Here, the loop starting point candidate is by the execution instruction recording section 110a/b as described with reference to FIG. 1. In other words, the execution instruction recording section 110a/b decides on each instruction inst[i] (where i is any non-negative integer that meets the relation $0 \leq i < n$, hereinafter the same shall apply) in a sequence of instructions inst[0 ... n] stored in the storage section 105a/b (buffer) in turn as a loop starting point candidate instruction inst[s], and passes a request for a loop determination to the loop detection section 200 on a case-by-case basis together with position information s on the loop starting point candidate. Alternatively, the loop starting point candidate can be decided on by the address comparing section 210. In this case, the address comparing section 210 decides on each instruction inst[i] in the sequence of instructions inst[0 . . . n] in turn as a loop starting point candidate instruction inst[s], and compares the address of the loop starting point candidate instruction inst[s] with the address of the last instruction inst[n] on a case-by-case basis.

In response to the determination result of an address match from the address comparing section 250, the call stack comparing section 220 reads call stack information from the storage section 105a/b (buffer), and compares a call stack upon execution of the loop starting point candidate instruction inst [s] with a call stack upon execution of the last instruction inst[n]. In the embodiment, the call stack information stored in the storage section 105a/b (buffer) is a return address in each of stack frames constructing a call stack upon execution of each instruction inst[i]. The comparison result by the call stack comparing section 220 is passed to the determination result outputting section 240 together with the position information s on the starting point candidate.

Figure 3:
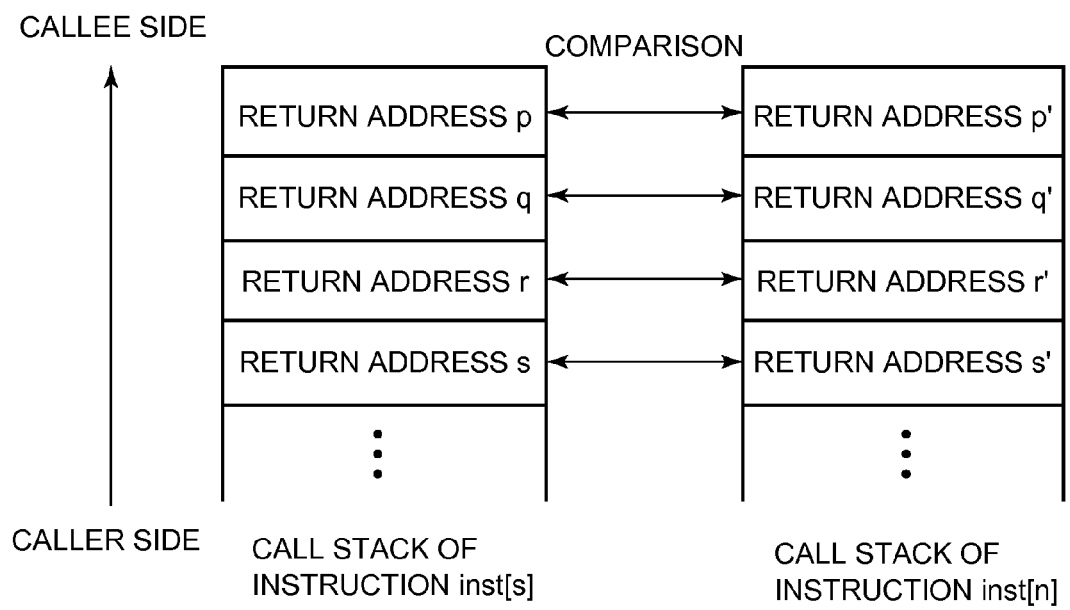
FIG. 3 is a diagram showing an example of comparison between call stacks by the loop detection section 200 according to the first embodiment of the present invention.

Here, the comparison between call stacks by the call stack comparing section 220 does not need to be made with respect to all the return addresses in all the stack frames constructing a call stack. In other words, the comparison between call stacks by the call stack comparing section 220 can be replaced by a comparison with respect to respective return addresses from the last stacked stack frame to the k-th stack frame (where k is a given positive integer) because of little effect on the performance of the match/mismatch determination of call stacks as long as an appropriate value is set for k. If such a given positive integer is set as k=4, the call stack comparing section 220 will compare respective return addresses in the top four stack frames of call stacks of both instructions as shown in FIG. 3 to determine a match/mismatch between the call stacks of both instructions. In the example shown in FIG. 3, it is assumed that the stacks grow in a positive direction.

It is preferred that the call stack comparing section 220 should include a TOPk calculation section 225 to find the given positive integer k that has little effect on the performance of the match/mismatch determination of call stacks. The TOPk calculation section 225 finds the given positive integer k as follows, namely: If the depth of the shallowest call stack in call stacks upon execution of respective instructions inst[i] in the sequence of instructions inst[0 . . . n] is denoted by m, the depth of a call stack upon execution of the loop starting point candidate instruction inst[s] is denoted by $k_1$, and the depth of a call stack upon execution of the last instruction inst[n] is denoted by $k_2$, the TOPk calculation section 225 calculates the given positive integer k as a smaller one between the value obtained by subtracting m from $k_1$ and the value obtained by subtracting m from $k_2$.

The given positive integer k is expressed in the following equation in which callStack[i].depth denotes the depth of a call stack upon execution of the i-th instruction inst[i]:

$$k=\min(k_1,k_2) \qquad (1)$$

where $$m=\min_{0 \leq i \leq n} \text{callStack}[i].\text{depth} \qquad (2)$$

$$k_1=\text{callStack}[s].\text{depth}-m \qquad (3)$$

$$k_2=\text{callStack}[n].\text{depth}-m \qquad (4)$$

Here, as mentioned above, call stack information on each instruction inst[i] is stored in the storage section 105a/b (buffer) upon execution of each instruction inst[i] by means of the call stack recording/constructing section 115a/b functioning as the call stack recording section provided in the compiler 100a or the tracing engine 150. Alternatively, the call stack comparing section 220 can have a call stack constructing section 230 so that the call stack constructing section 230 will construct a call stack. In this case, the TOPk calculation section 225 calculates the given positive integer k after the call stack is constructed.

The call stack constructing section 230 reads the type and address of each instruction inst[i] from the storage section 105a/b (buffer), constructs a call stack upon execution of the loop starting point candidate instruction inst[s] and a call stack upon execution of the last instruction inst[n], and stores them in the storage section 105a/b (buffer) as call stack information.

To be more specific, the call stack constructing section 230 refers to the type and address of each instruction inst[i] to create a branched linked list, each node of which represents a stack frame and has an address field for recording a return address in the stack frame and a parent field for recording reference (link) to a node representing the previous stack frame of the stack frame. As a result, the call stack upon execution of an instruction inst[i] is constructed by tracking back the records of previous stack frames sequentially from a node representing the stack frame corresponding to the instruction inst[i] as a starting point based on the reference (link) in the parent field of each node and connecting return addresses in the address fields of the respective nodes tracked back.

The depth of the call stack upon execution of each instruction inst[i], which is used by the TOPk calculation section 225 to find the given positive integer k, is determined as the depth/number of levels from a node representing the stack frame corresponding to the instruction inst[i] to the root node whose address field and parent field are both NULL. Although the depth/number of levels is the relative depth/number of levels with reference to the root node, it has no effect on each of the values $k_1$, $k_2$, and k determined by Equation (3), Equation (4), and Equation (1), respectively, because the depth m of the shallowest call stack determined by Equation (2) is also the relative depth/number of levels.

Figure 4:
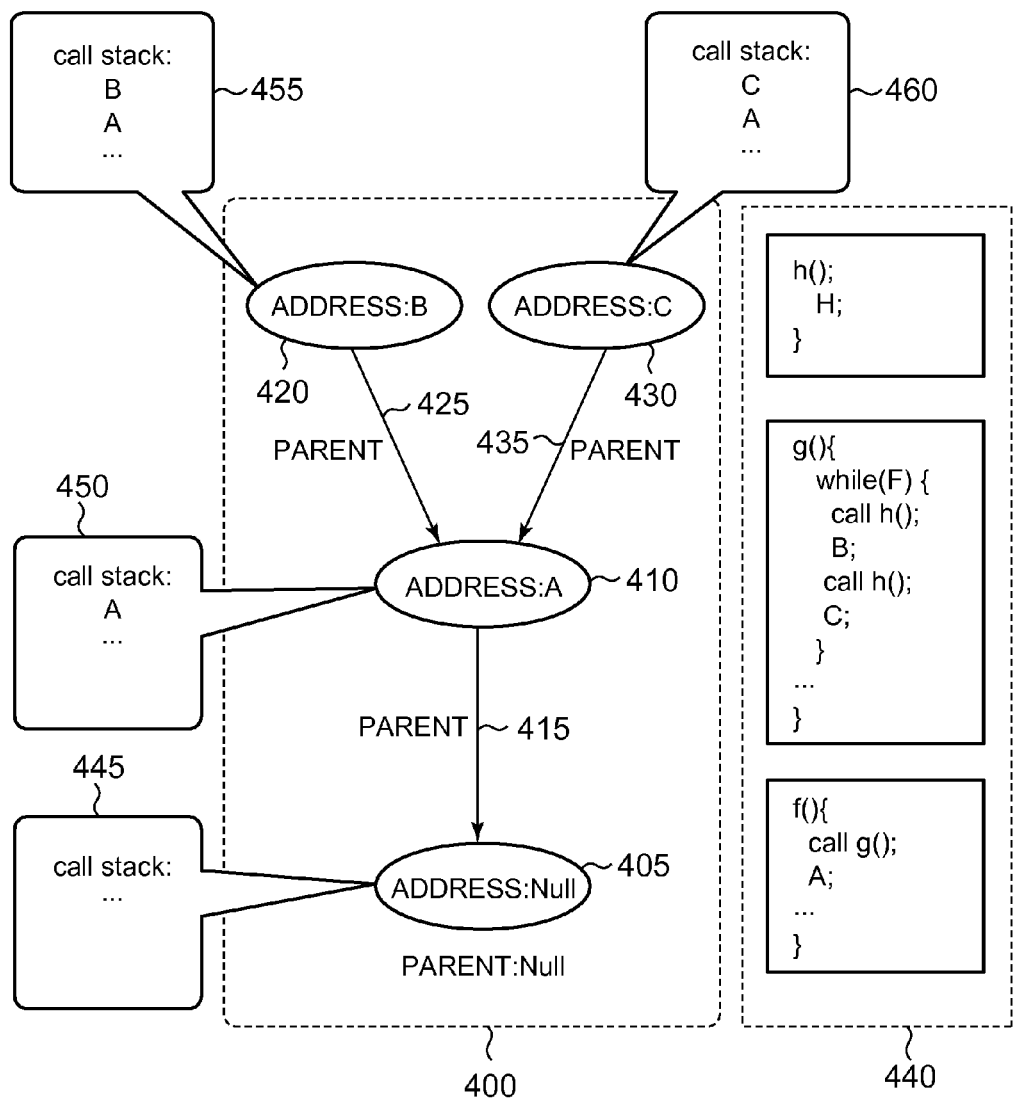
FIG. 4 shows a linked list created by the loop detection section 200 according to the first embodiment of the present invention.

FIG. 4 shows an example of a linked list 400 created by the call stack constructing section 230. The linked list 400 shown in FIG. 4 is a linked list created for a call stack upon execution of code 440. Since a node 405 in the linked list 400 is the root node corresponding to a stack frame for function f executed first, NULL is registered in the address field and the parent field, respectively.

A node 410 in the linked list 400 represents a stack frame stacked when function g is called in function f. The address of instruction A following a call instruction to function g is registered as a return address in the address field of the node 410. In the parent field of the node 410, reference 415 to the node 405 is registered to represent the previous stack frame.

A node 420 in the linked list 400 represents a stack frame stacked when function h is called in function g for the first time. In the address field of the node 420, the address of instruction B following the first call instruction to function h is registered as a return address. In the parent field of the node 420, reference 425 to the node 410 is registered to represent the previous stack frame.

A node 430 in the linked list 400 represents a stack frame stacked when function h is called in function g for the second time. In the address field of the node 430, the address of instruction C following the second call instruction to function h is registered as a return address. In the parent field of the node 430, reference 435 to the node 410 is registered to represent the previous stack frame.

As a result of creating such a linked list 400, as mentioned above, a call stack upon execution of each instruction inst[i] in code 440 is constructed by tracking back the records of previous stack frames sequentially from a node representing the stack frame corresponding to the instruction inst[i] as a starting point based on the reference (link) in the parent field of each node and connecting return addresses in the address fields of the respective nodes tracked back.

The construction of a call stack upon execution of function h in code 440 will be considered as an example. Since function h is called twice on condition that the condition of instruction F in function g is satisfied, the following will consider a case where instruction H is executed by the first call instruction to function h. In this case, the node representing a stack frame corresponding to instruction H is the node 420 in the linked list 400.

Therefore, when the node 420 is set as the starting point, the node 410 and the node 405 can be tracked back sequentially in this order according to the references in the parent fields. Then, the return addresses in the address fields of the respective nodes tracked back can be connected to construct B-A-NULL or a call stack BA 455.

Next, a case where instruction H is executed by the second call instruction to function h will be considered. In this case, the node representing a stack frame corresponding to instruction H is the node 430 in the linked list 400. Therefore, when the node 430 is set as the starting point, the node 410 and the node 405 can be tracked back sequentially in this order according to the references in the parent fields. Then, the return addresses in the address fields of the respective nodes tracked back can be connected to construct C-A-NULL or a call stack CA 460.

Each instruction inst[i] is associated with a node in the linked list representing a stack frame corresponding to the instruction inst[i] during the creation of the linked list. The details of such processing will be described later in connection with a flowchart to create a linked list shown in FIG. 7.

The determination result outputting section 240 outputs a determination result indicating that the sequence of instructions inst[s . . . n] form a loop on condition that the comparison results by the address comparing section 210 and the call stack comparing section 220 both indicate matches. As an example, the following will consider a sequence of execution instructions H-B-H obtained by executing function g in code 440 shown in FIG. 4. The head H of the sequence of instructions is instruction H executed by the first call instruction to function h. On the other hand, the end H of the sequence of instructions is instruction H executed by the second call instruction to function h.

Therefore, the address of the head H of the sequence of instructions matches the address of the end H of the sequence of instructions. However, as described about call stacks upon execution of both instructions with reference to FIG. 4, since the head H is BA 455 whereas the end H is CA 460, both do not match. Therefore, the determination result outputting section 240 outputs a determination result indicating that no loop is formed with respect to the sequence of execution instructions H-B-H, i.e., that it is a false loop.

In fact, the instruction executed after the sequence of execution instructions H-B-H is C, and since the sequence of execution instructions H-B-H is not repeated, it is a false loop. Thus, the loop detection section 200 according to the first embodiment makes determinations on whether to form a loop or not based not only on a match between addresses but also on a match between call stacks as conditions, and this can solve the conventional false detection problem of taking a false loop as a loop.

Further, as another example, the following will consider a sequence of execution instructions H-B-H-C-A-H obtained by executing function g in code 440 shown in FIG. 4. In this case, the head H and end H of the sequence of instructions are both instruction H executed by the first call instruction to function h. Therefore, since call stacks upon execution of the head H and the end H are both BA 455, the call stacks upon execution of the head H and the end H as well as the addresses thereof match with each other. Therefore, the determination result outputting section 240 outputs a determination result indicating that a loop is formed with respect to the sequence of execution instructions H-B-H-C-A-H.

In fact, the instructions executed in order following the sequence of execution instructions H-B-H-C-A-H are B, H, C, and A, and since the sequence of execution instructions H-B-H-C-A-H can be repeated, it is a true loop. Thus, the loop detection section 200 according to the first embodiment makes determinations on whether to form a loop or not based on a match between addresses and a match between call stacks as conditions, and this can solve the conventional detection mistake problem of taking, as a false loop, a true loop including a return instruction from a function to which the first instruction in the sequence of instructions belongs.

Figure 5:
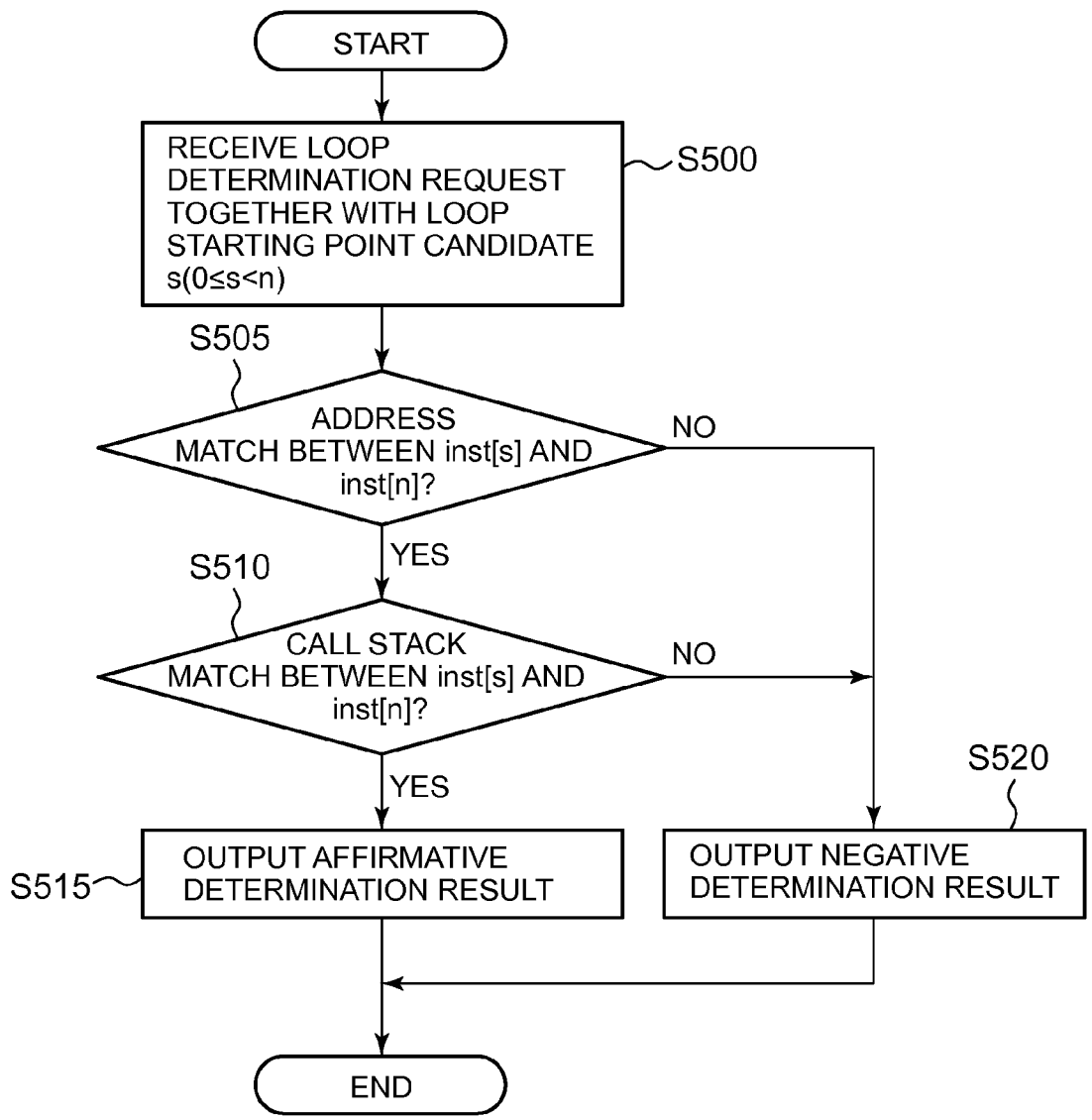
FIG. 5 is a flowchart showing a flow of loop detection processing performed by the loop detection section 200 according to the first embodiment of the present invention.
Figure 6:
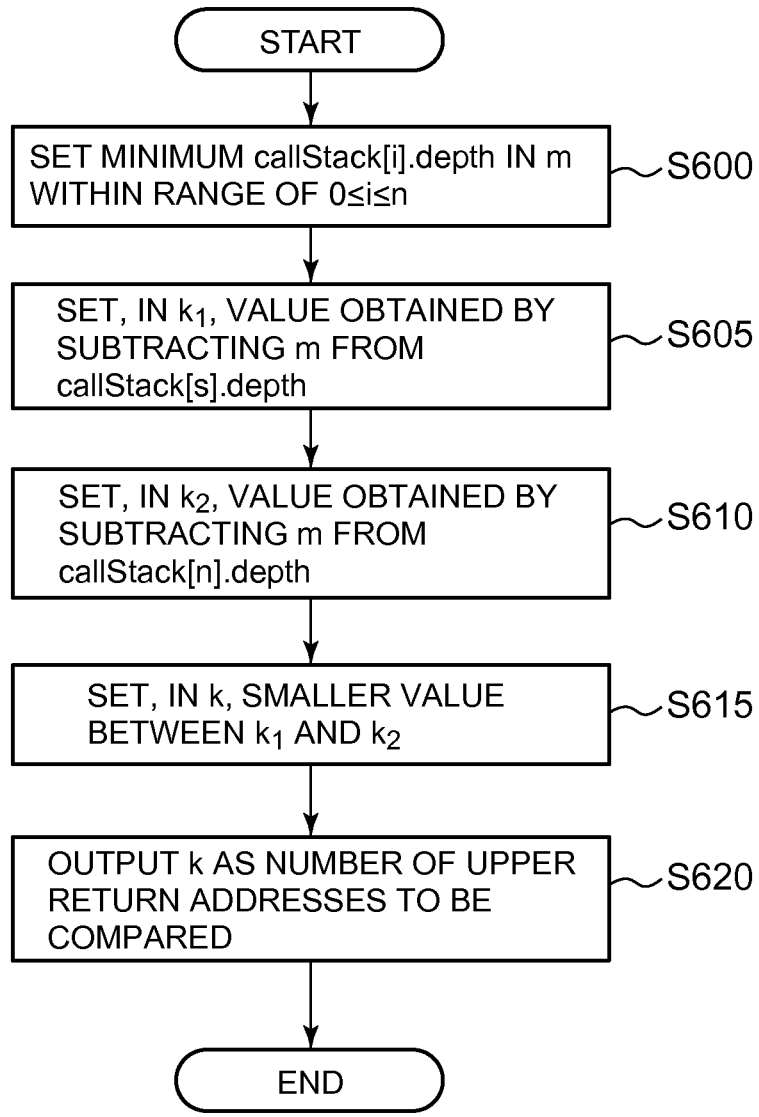
FIG. 6 is a flowchart showing a flow of TOPk calculation processing performed by the loop detection section 200 according to the first embodiment of the present invention.
Figure 7:
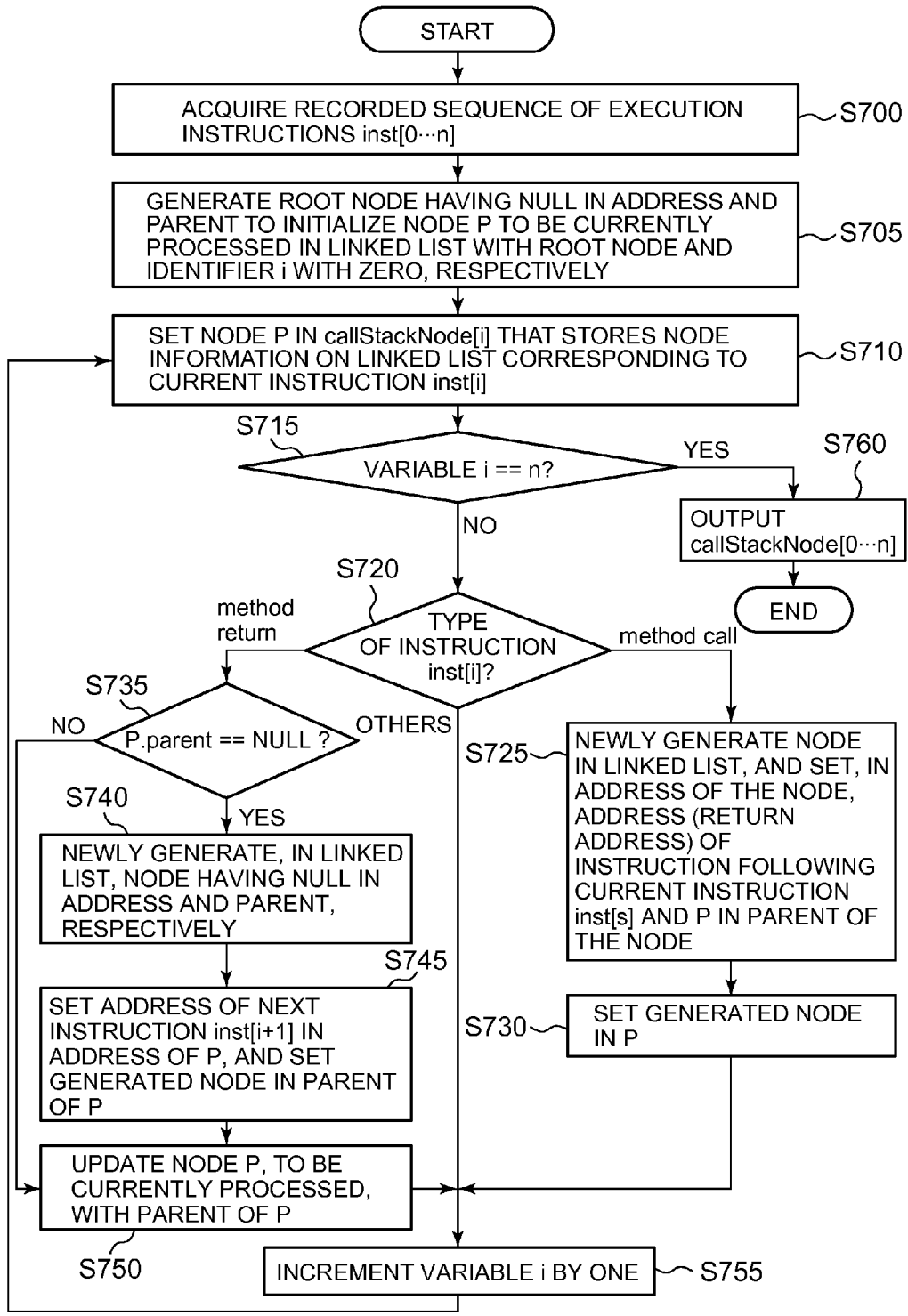
FIG. 7 is a flowchart showing a flow of linked list creation processing performed by the loop detection section 200 according to the first embodiment of the present invention.
Figure 8:
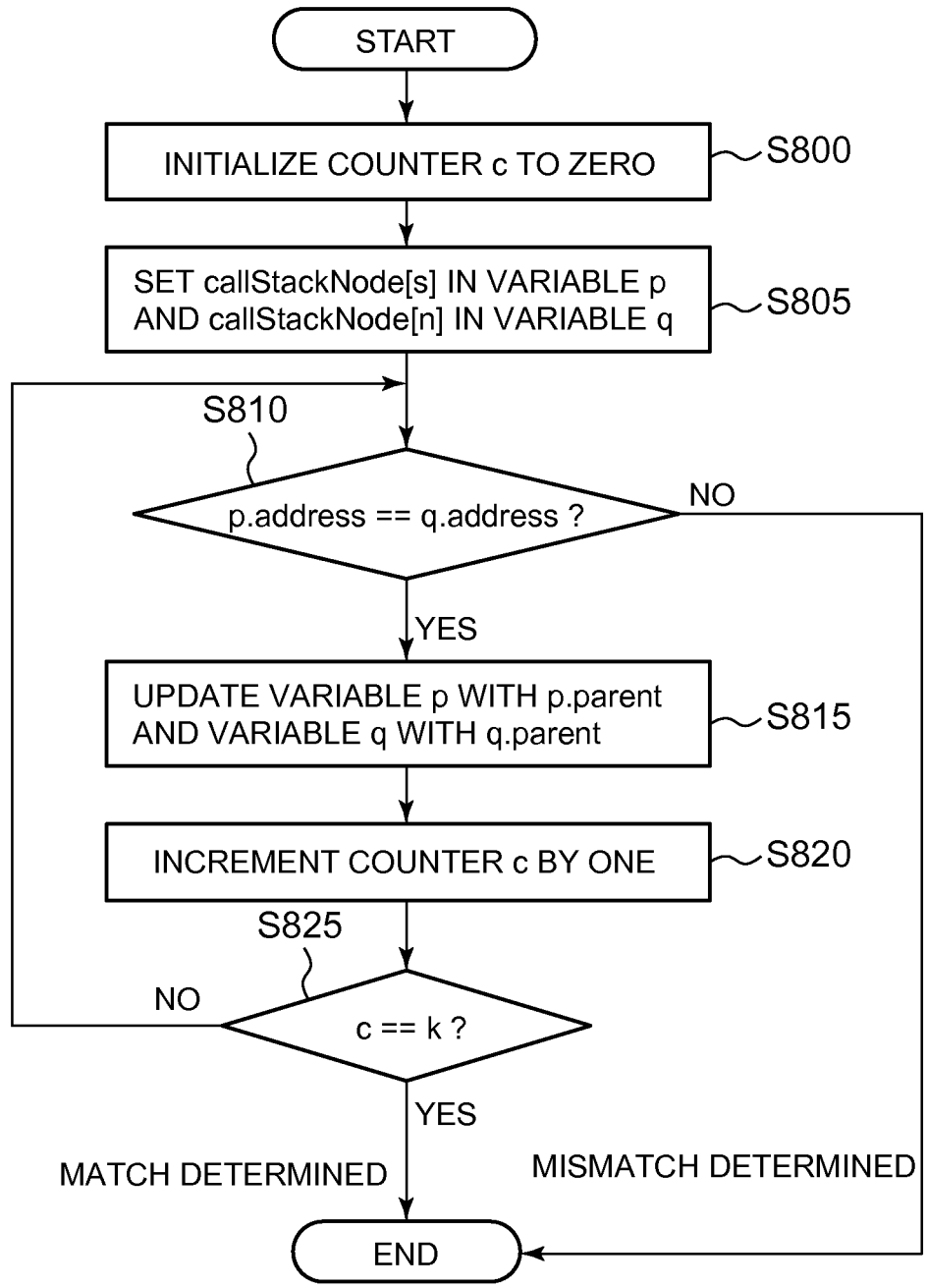
FIG. 8 is a flowchart showing a flow of call stack comparison processing shown in FIG. 5.

Referring next to FIG. 5 to FIG. 8, a flow of processing performed by the loop detection section 200 according to the first embodiment will be described. FIG. 5 is a flowchart showing a flow of the entire loop detection processing performed by the loop detection section 200 according to the first embodiment. FIG. 6 is a flowchart showing a flow of TOPk calculation processing. FIG. 7 is a flowchart showing a flow of linked list creation processing. FIG. 8 is a flowchart showing a flow of call stack comparison processing using a linked list.

The processing shown in FIG. 5 starts at step 500 in which the loop detection section 200 receives a loop determination request including information on a loop starting point candidate $s(0 \le s < n)$. Then, in response to receiving the loop determination request, the address comparing section 210 reads the loop starting point candidate inst[s] and address information on the last inst[n] in the sequence of instructions from the storage section 105a/b (buffer) to determine whether the addresses of both the instruction of the starting point candidate and the last instruction match with each other (step 505).

When both the address of the instruction of the starting point candidate and the address of the last instruction match with each other (YES in step 505), the processing proceeds to step 510, in which the call stack comparing section 220 reads call stack information on the loop starting point candidate inst[s] and the last inst[n] in the sequence of instructions from the storage section 105a/b (buffer) in response to the determination result indicating that both addresses match to determine whether call stacks upon execution of both the instruction of the starting point candidate and the last instruction match with each other.

When the call stacks upon execution of both the instruction of the starting point candidate and the last instruction match (YES in step 510), the processing proceeds to step 515, in which the determination result outputting section 240 outputs an affirmative determination result indicating that the sequence of instructions inst[s . . . n] is a loop. On the other hand, when it is determined in step 505 that both addresses do not match, or when it is determined in step 510 that the call stacks do not match, the processing proceeds to step 520, in which the determination result outputting section 240 output a negative determination result indicating that the sequence of instructions inst[s . . . n] is not a loop. The processing is ended after step 515 or step 520.

The TOPk calculation processing shown in FIG. 6 is optionally performed by the TOPk calculation section 225 at any timing before the call stack comparison processing (S515) shown in FIG. 5 on condition that call stack information on the sequence of instructions inst[s . . . n] is stored in the storage section 105a/b (buffer). The processing starts at step 600, in which the TOPk calculation section 225 sets, in m, the depth $min0 \leq i \leq n callStack[i].depth$ of the shallowest call stack in call stacks during execution of respective instructions in the sequence of instructions inst[0 . . . n].

Then, the TOPk calculation section 225 sets, in $k_1$, value obtained by subtracting m from the depth callStack[s].depth of the call stack of the loop starting point candidate (step 605). Similarly, the TOPk calculation section 225 sets, in $k_2$, a value obtained by subtracting m from the depth callStack[n].depth of the last call stack in the sequence of instructions (step 610).

Then, the TOPk calculation section 225 sets, in k, a value of min(k1, k2) expressing a smaller value between $k_1$ and $k_2$ (step 615), and outputs k as the number of upper return addresses to be compared (step 620). After that, the processing is ended.

When call stack information is not recorded upon recording an execution instruction, the linked list creation processing shown in FIG. 7 is performed by the call stack constructing section 230 (or the call stack recording/constructing section 115a, b) at any timing before the call stack comparison processing (S515) shown in FIG. 5. As mentioned above, in the linked list creation processing shown in FIG. 7, each instruction inst[i] is associated with a node representing a stack frame corresponding to the instruction inst[i] simultaneously with the creation of a linked list. Specifically, callStackNode[i] for storing information on a corresponding node in the linked list is prepared for each instruction inst[i] and the node in the linked list is created while registering, in callStackNode[i] of the corresponding instruction, reference to the created node.

In FIG. 7, the processing starts at step 700, in which the call stack constructing section 230 reads a sequence of instructions inst[0 . . . n] from the storage section 105a/b (buffer). Then, the call stack constructing section 230 generates a root node having NULL as values in both the address field and the parent field, and initializes P with the root node and i with zero, where i is the index of the instruction inst[i] that is currently processed and P points to the node in the linked list corresponding to inst[i], respectively (step 705).

Then, the call stack constructing section 230 sets node P in callStackNode[i], which stores node information corresponding to the instruction inst[i] (step 710). When the processing step 710 is executed for the first time, the value of variable i is zero and reference to the root node in the linked list is set in callStackNode[0]. This (The fact that callStackNode[i] is the root node, or in other words, parent field of callStackNode[i] is NULL) means that there is no call instruction having, as call destination, the function to which the first instruction inst[i] belongs, in the sequence of instructions inst[0 . . . i], but this does not necessarily have to be true. that is, If there is such a call instruction later in the sequence of instructions inst[i+1 . . . n], a root node is newly generated in steps 740 and 745 to be described later and the address field and the parent field of the previous root node are updated to appropriate values.

Then, the call stack constructing section 230 determines whether variable i is equal to n (step 715). When the instruction to be currently processed is not the n-th instruction (NO in step 715), the processing proceeds to step 720, in which the call stack constructing section 230 determines the type of instruction inst[i] to be currently processed. When the type of instruction is a call instruction of the function, the processing proceeds to step 725, in which the call stack constructing section 230 newly generates a node in the linked list. Then, the call stack constructing section 230 sets, in the address field of the node newly generated, the address of an instruction following the call instruction inst[i] in program address order (return address), and sets node P in the parent field. After that, the call stack constructing section 230 updates node P with the node newly generated in step 725 (step 730).

On the other hand, when it is determined in step 720 that there is an instruction whose type of instruction is a return instruction, the processing proceeds to step 735, in which the call stack constructing section 230 determines whether the value in the parent field of node P to be currently processed is NULL. When the value of the parent field is NULL (YES in step 735), the processing proceeds to step 740, in which the call stack constructing section 230 newly generates a node of the linked list having NULL in both the address field and the parent field. Then, the call stack constructing section 230 updates the address field of node P with the address of instruction inst[i+1] following the instruction inst[i] in the sequence of instructions inst[0 . . . n], and the parent field with the node newly generated in step 740 (step 745). In this case, inst[i+1] is considered to be a return destination instruction of the return instruction inst[i].

Following step 745 or when it is determined in step 735 that the value in the parent field of node P to be currently processed is not NULL, the processing proceeds to step 750, in which the call stack constructing section 230 updates node P with the parent field value of P, that is, P.parent. Following step 730 or step 750, or when it is determined in step 720 that the type of instruction is neither a return instruction nor a call instruction, the processing proceeds to step 755, in which the call stack constructing section 230 increments variable i by one and returns the processing to step 710 to repeat the sequence of processing steps.

In step 715, when variable i is equal to n, i.e., upon completion of the creation of the linked list and association of each instruction inst[i] with a node representing a stack frame corresponding to the instruction inst[i], the call stack constructing section 230 outputs callStackNode[0 . . . n] (step 760). After that, the processing is ended.

FIG. 8 is a flowchart showing the details of processing when the call stack comparison processing (S515) shown in FIG. 5 is performed by using the linked list. The processing starts at step 800, in which the call stack comparing section 220 initializes counter c to zero. Then, the call stack comparing section 220 sets, in variable p, node information callStackNode[s] corresponding to the loop starting point candidate instruction inst[s] and sets, in variable q, node information callStackNode[n] corresponding to the last instruction inst[n] (step 805).

Then, the call stack comparing section 220 compares p.address with q.address (step 810). When both addresses do not match (NO in step 810), the call stack comparing section 220 ends the processing with a determination result indicating that call stacks do not match. On the other hand, when both addresses match (YES in step 810), the processing proceeds to step 815, in which the call stack comparing section 220 updates variable p with p.parent and variable q with q.parent.

Then, the call stack comparing section 220 increments counter c by one (step 820) and determines whether counter c is equal to the number of upper return addresses, k, to be compared (step 825). When counter c is not equal to the number of upper return addresses, k, to be compared (NO in step 825), the call stack comparing section 220 returns to the processing step 810 and repeats the sequence of processing steps. On the other hand, when counter c is equal to the number of upper return addresses, k, to be compared (YES in step 825), the call stack comparing section 220 ends the processing with a determination result indicating that call stacks match.

Figure 9:
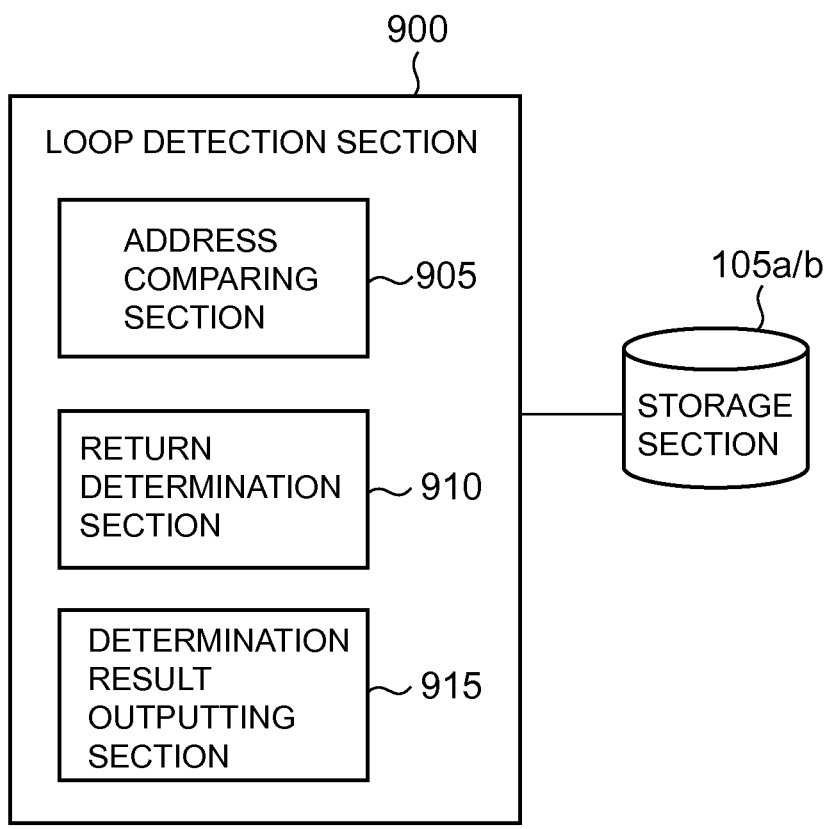
FIG. 9 is a functional block diagram of a loop detection section 900 according to a second embodiment of the present invention.

FIG. 9 is a functional block diagram of a loop detection section 900 according to a second embodiment of the present invention. The loop detection section 900 according to the second embodiment includes an address comparing section 905, a return determination section 910, and a determination result outputting section 915 to determine a loop on condition that the address of a loop starting point candidate instruction matches the address of the last instruction, and that a sequence of instructions does not include any return instruction from the function to which the first instruction in the loop belongs.

The loop detection section 900 is also connected to the storage section 105a/b (buffer) for storing information on a sequence of instructions whose number of executions is equal to or more than a predetermined threshold value as described with reference to FIG. 1. In the following description, it is assumed that a sequence of instructions inst[0 ... n] consisting of n+1 instructions is stored in the storage section 105a/b (buffer).

The address comparing section 905 reads address information on a sequence of instructions from the storage section 105a/b (buffer) in response to receiving a loop determination request in the loop detection section 900, and compares respective addresses of a loop starting point candidate instruction inst[s] and the last instruction inst[n] in the sequence of instructions. The comparison result between the addresses of inst[s] and inst[n] made by the address comparing section 905 is passed to the return determination section 910 and the determination result outputting section 915 together with position information s on the starting point candidate. Since the processing performed by the address comparing section 905 is the same as the processing performed by the address comparing section 210 in the loop detection section 200 according to the first embodiment of the present invention, redundant description will be omitted.

In response to a comparison result of an address match from the address comparing section 905, the return determination section 910 determines whether any return instruction from a function to which the loop starting point candidate instruction inst[s] belongs is included in the sequence of instructions inst[s ... n]. The result of the determination made by the return determination section 910 is passed to the determination result outputting section 920 together with position information s on the starting point candidate.

The return determination section 910 makes the above determination by comparing stack pointer SP upon execution of the loop starting point candidate instruction inst[s] with stack pointer SP upon execution of each instruction in the sequence of instructions inst[s ... n]. To be more specific, if there is an instruction in the sequence of instructions inst[s ... n] as having stack pointer SP larger than the stack pointer SP upon execution of the loop starting point candidate instruction inst[s], the return determination section 910 can determine that a return instruction from the loop starting point candidate is included in the sequence of instructions inst[s ... n]. In this case, it is assumed that the stacks grow in a negative direction.

Alternatively, the return determination section 910 can also make the above determination by comparing the depth of a call stack upon execution of the loop starting point candidate instruction inst[s] with the depth of a call stack upon execution of each instruction in the sequence of instructions inst[s ... n]. To be more specific, the return determination section 910 determines a relative depth level of each instruction in the sequence of instructions inst[s ... n] with reference to the depth (=0) of the call stack upon execution of the loop starting point candidate instruction inst[s], and if there is an instruction having a negative depth level in the sequence of instructions inst[s ... n], the return determination section 910 can determine that a return instruction from the loop starting point candidate is included in the sequence of instructions inst[s ... n].

Note that the call stack recording/constructing section 115a/b as described with reference to FIG. 1 can record stack pointer SP information into the storage section 105a/b (buffer) when the execution instruction recording section 110a/b starts recording the sequence of instructions. Further, the return determination section 910 can determine information on the relative depth level of each call stack by increasing/decreasing the depth level of the call stack according to each type of instruction in the sequence of instructions inst[s ... n]. The details will be described later with reference to FIG. 12.

The determination result outputting section 915 outputs a determination result indicating that the sequence of instructions inst[s ... n] is a loop on condition of receiving the comparison result of an address match from the address comparing section 905 and a determination result from the return determination section 910, which indicates that no return instruction from the loop starting point candidate is included.

Here, a loop determination result from the loop detection section 900 according to the second embodiment of the present invention will be described by taking code shown in FIG. 10B as an example. FIG. 10A is a table showing loop determination results by a conventional method for prohibiting the generation of a trace including a return instruction from a function to which the first instruction in the trace belongs, and loop determination results by the loop detection section 900 according to the second embodiment of the present invention. In the table, four kinds of sequences of instructions (G-B-G, A-G-B-G, A-G-B-G-C-A, G-B-G-C-A-G from the top) obtained from the code shown in FIG. 10B are compared with respect to the loop determination results by the respective methods.

Note that two arrows drawn below each of the sequence of instructions are such that the upper one indicates the start position of the trace and the lower one indicates the start position of the loop. To be exact, the loop determination results by the conventional method are the results of permitting/prohibiting the generation of each trace.

At first, the first sequence of instructions G-B-G will be considered. In the sequence of instructions G-B-G, since the head G of the trace and the head G of the loop are the same, the loop determination results by the conventional method and the present invention are not different. In other words, G-B in the sequence of instructions G-B-G indicates that a return instruction from function g to which the first instructions G of the trace/loop belong is included in the sequence of instructions, and this means that a determination result indicative of a false loop is obtained by both methods. In fact, since the instruction to be executed following the sequence of instructions G-B-G is instruction C, the sequence of instructions G-B-G is a false loop and the determination results by both methods are correct.

Next, the third sequence of instructions A-G-B-G-C-A will be considered. In the sequence of instructions A-G-B-G-C-A, since the head A of the trace and the head A of the loop are the same, the loop determination results by the conventional method and the present invention are not different. In other words, no return instruction from function f to which the first instructions A of the trace/loop belong is included in the sequence of instructions A-G-B-G-C-A, and this means that a determination result indicative of a loop is obtained by both methods. In fact, since the sequence of instructions A-G-B-G-C-A can be repeatedly executed, the sequence of instructions is a true loop and the determination results by both methods are correct.

Next, the second sequence of instructions will be considered. In the sequence of instructions A-G-B-G, since the top A of the trace and the top G of the loop are different, the loop determination results by the conventional method and the present invention are different. In other words, since the conventional method shows that no return instruction from function f to which the first instruction A of the trace belongs is included in the sequence of instructions, a determination result indicative of a loop is obtained. On the other hand, in the present invention, since G-B in the sequence of instructions A-G-B-G indicates that a return instruction from function g to which the first instruction G of the loop belongs is included in the sequence of instructions, a determination result indicative of a false loop is obtained. In fact, since the instruction to be executed following the sequence of instructions G-B-G is instruction C and the sequence of instructions G-B-G is not repeatedly executed, it is a false loop. Thus, according to the present invention, the loop determination can be made correctly even in the case where the determination result by the conventional method indicates a false loop.

Next, the fourth sequence of instructions will be considered. In the sequence of instructions G-B-G-C-A-G, since the head G of the trace and the head G of the loop are the same, the loop determination results by the conventional method and the present invention are not different. In other words, G-B in the sequence of instructions G-B-G-C-A-G indicates that a return instruction from function g to which the first instructions G of the trace/loop belong is included in the sequence of instructions, and this means that a determination result indicative of a false loop is obtained by both methods.

However, since the sequence of instructions G-B-G-C-A-G is a sequence of instructions that can be repeatedly executed in reality, it is a true loop and the determination results by both methods are wrong. However, the starting point of the sequence of instructions G-B-G-C-A-G is atypical compared to A-G-B-G-C-A, and a detection request for such a loop is unlikely to be made in some systems. Further, this is not such an erroneous detection that takes a false loop as a loop, and such a detection mistake can be within an acceptable range.

Figure 11:
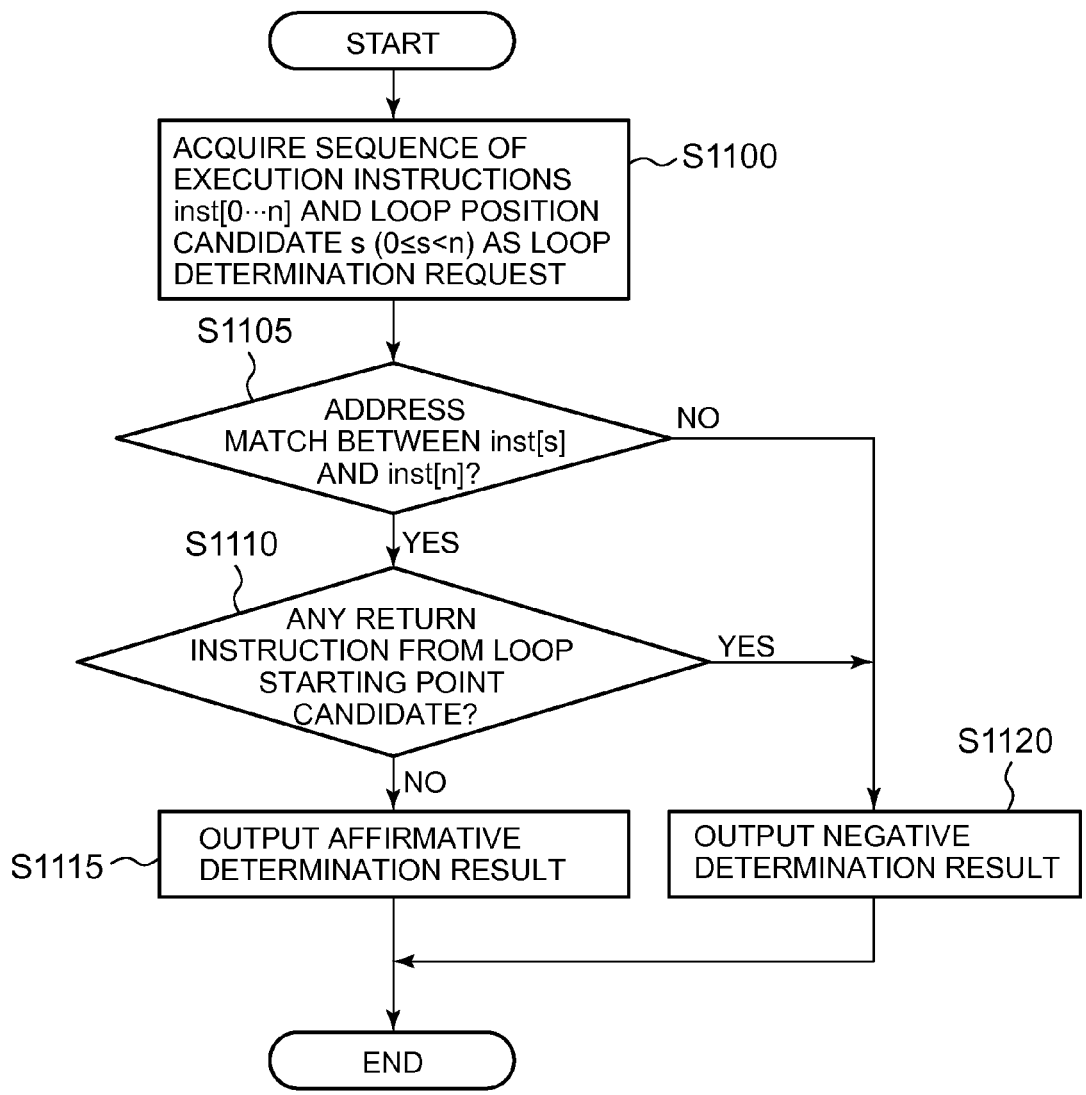
FIG. 11 is a flowchart showing a flow of loop detection processing performed by the loop detection section 900 according to the second embodiment of the present invention.
Figure 12:
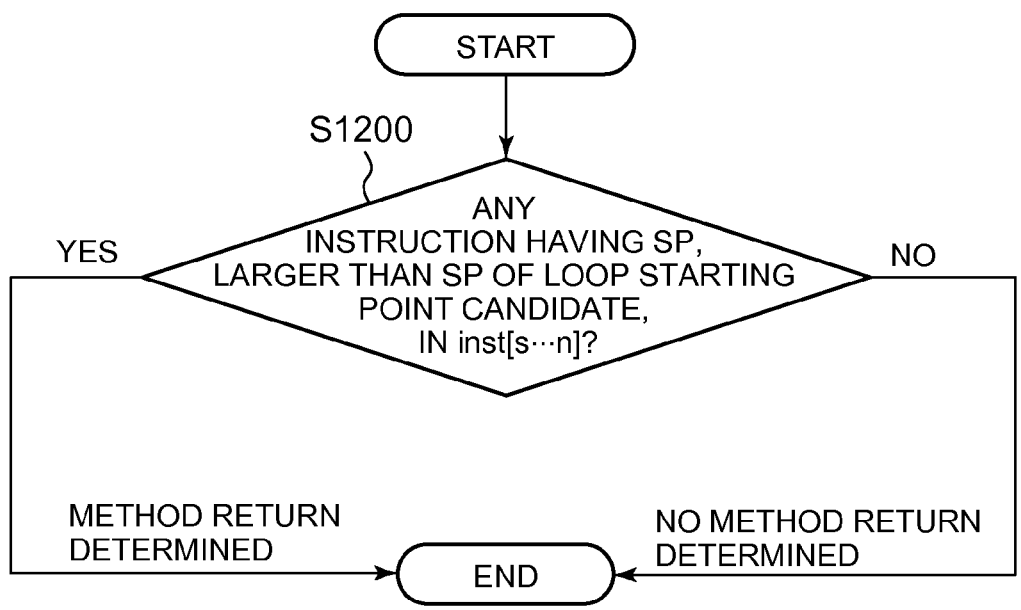
FIG. 12 is a flowchart showing an example of a flow of return instruction determination processing shown in FIG. 11.
Figure 13:
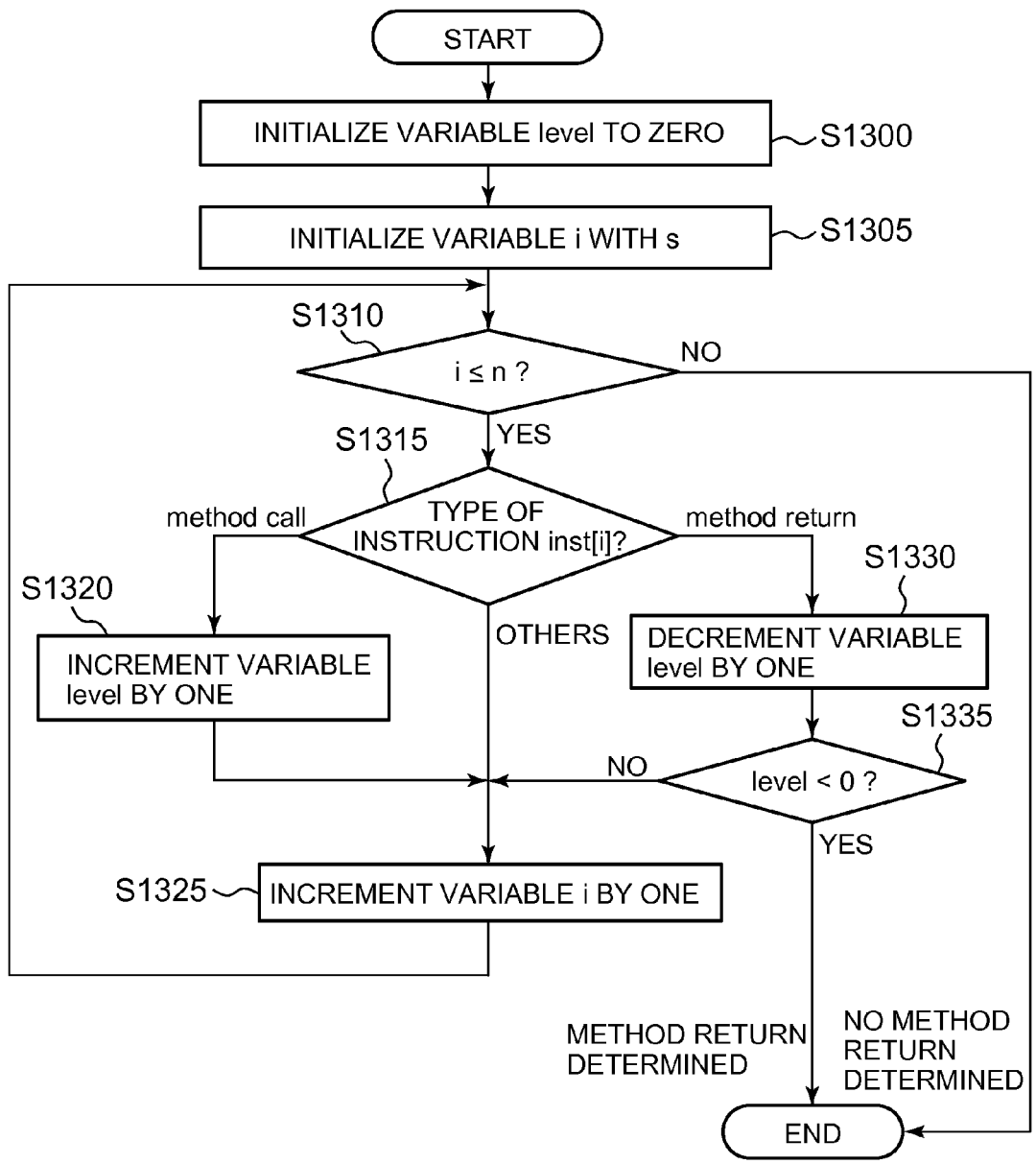
FIG. 13 is a flowchart showing another example of the flow of return instruction determination processing shown in FIG. 11.

Referring next to FIG. 11 to FIG. 13, a flow of processing performed by the loop detection section 900 according to the second embodiment will be described. FIG. 11 is a flowchart showing a flow of the entire loop detection processing performed by the loop detection section 900 according to the second embodiment. FIG. 12 is a flowchart showing an example of a flow of return instruction determination processing in step 1110 of the flowchart shown in FIG. 11. FIG. 13 is a flowchart showing another example of the flow of return instruction determination processing in step 1110 of the flowchart shown in FIG. 11.

The processing shown in FIG. 11 starts at step 1100 in which the loop detection section 900 receives a loop determination request including information on a loop starting point candidate s (0≤s<n). Then, in response to receiving the loop determination request, the address comparing section 905 reads the address information on the loop starting point candidate inst[s] and the last inst[n] in the sequence of instructions from the storage section 105a/b (buffer), and determines whether both of the addresses of the starting point candidate instruction and the last instruction match with each other (step 1105).

When both addresses of the starting point candidate instruction and the last instruction match (YES in step 1105), the processing proceeds to step 1110. In step 1110, in response to a determination result indicating that the addresses match, the return determination section 910 determines whether any return instruction from a function to which the loop starting point candidate instruction inst[s] belongs is included in the sequence of instructions inst[s . . . n].

When no return instruction is included (NO in step 1110), the processing proceeds to step 1115, in which the determination result outputting section 915 outputs an affirmative determination result indicating that the sequence of instructions inst[s . . . n] is a loop. On the other hand, when it is determined in step 1105 that the addresses do not match, or in step 1110 that any return instruction is included, the processing proceeds to step 1120, in which the determination result outputting section 915 outputs a negative determination result indicating that the sequence of instructions inst[s . . . n] is not a loop. The processing is ended after step 1115 or step 1120.

The return instruction determination processing of the second embodiment shown in FIG. 12 starts at step 1200, in which the return determination section 910 compares stack pointer SP upon execution of the loop starting point candidate instruction inst[s] with stack pointer SP upon execution of each instruction in the sequence of instructions inst[s . . . n] to determine whether there is an instruction in the sequence of instructions inst[s . . . n] as having stack pointer SP larger than the stack pointer SP upon execution of the loop starting point candidate instruction inst[s].

When such an instruction exists in the sequence of instructions inst[s . . . n] (YES in step 1200), the return determination section 910 ends the processing with a determination result indicating that a return instruction from a function to which the loop starting point candidate instruction inst[s] belongs is included. On the other hand, when such an instruction does not exist in the sequence of instructions inst[s . . . n] (NO in step 1200), the return determination section 910 ends the processing with a determination result indicating that no return instruction from the function to which the loop starting point candidate instruction inst[s] belongs is included. Here, it is assumed that the stacks grow in the negative direction.

The return instruction determination processing of the second embodiment shown in FIG. 13 starts at step 1300, in which the return determination section 910 prepares a variable level indicative of the current relative value of the depth of a call stack with reference to the depth (=0) of a call stack upon execution of the loop starting point candidate instruction inst[s] and initializes it to zero. Then, the return determination section 910 initializes variable i for identifying an instruction, to be currently processed in the sequence of instructions inst[s . . . n], with identifier s of the loop starting point candidate (step 1305).

Then, the return determination section 910 determines whether identifier i of the instruction to be currently processed is equal to or less than n (step 1310). If identifier i of the instruction to be currently processed is equal to or less than n (YES in step 1310), the processing proceeds to step 1315, in which the return determination section 910 determines the type of instruction inst[i] to be currently processed.

In step 1315, when the type of instruction is a call instruction for a function, the processing proceeds to step 1320, in which the return determination section 910 increments the relative depth level of the current call stack by one. Then, the return determination section 910 increments, by one, variable i for identifying the instruction to be currently processed (step 1325), and returns to the processing step 1310 to repeat the sequence of processing steps.

In step 1315, when the type of instruction is neither a call instruction for a function nor a return instruction, the processing proceeds to step 1325, in which the return determination section 910 increments, by one, variable i for identifying the instruction to be currently processed (step 1325), and returns to the processing step 1310 to repeat the sequence of processing steps.

On the other hand, in step 1315, when the type of instruction is a return instruction, the processing proceeds to step 1330, in which the return determination section 910 decrements the current relative depth level of the call stack by one. Then, the return determination section 910 determines whether the current relative depth level of the call stack is smaller than zero (step 1335). When the current relative depth level of the call stack is smaller than zero (YES in step 1335), the return determination section 910 ends the processing with a determination result indicating that a return instruction from the function to which the loop starting point candidate instruction inst[s] belongs is included.

When the current relative depth level of the call stack is equal to or more than zero (NO in step 1335), the return determination section 910 increments, by one, variable i for identifying the instruction to be currently processed (step 1325), and returns to the processing step 1310 to repeat the sequence of processing steps.

On the other hand, in step 1310, when identifier i of the instruction to be currently processed is larger than n (NO in step 1310), i.e., when no relative depth level of the call stack becomes negative as a result of considering all the instructions in the sequence of instructions inst[s . . . n], the return determination section 910 ends the processing with a determination result indicating that no return instruction from the function to which the loop starting point candidate instruction inst[s] belongs is included.

As mentioned above, the loop detection apparatus according to the present invention can be implemented as one function (loop detection section 120a) of the compiler 100a for trace-based compilation, or as one function (loop detection section 120b) of the tracing engine 150 attached to the compiler 100b for trace-based compilation. The following will describe a flow of compilation processing by the compiler 100a or the compiler 100b and the tracing engine 150 with reference to FIG. 14.

Figure 14:
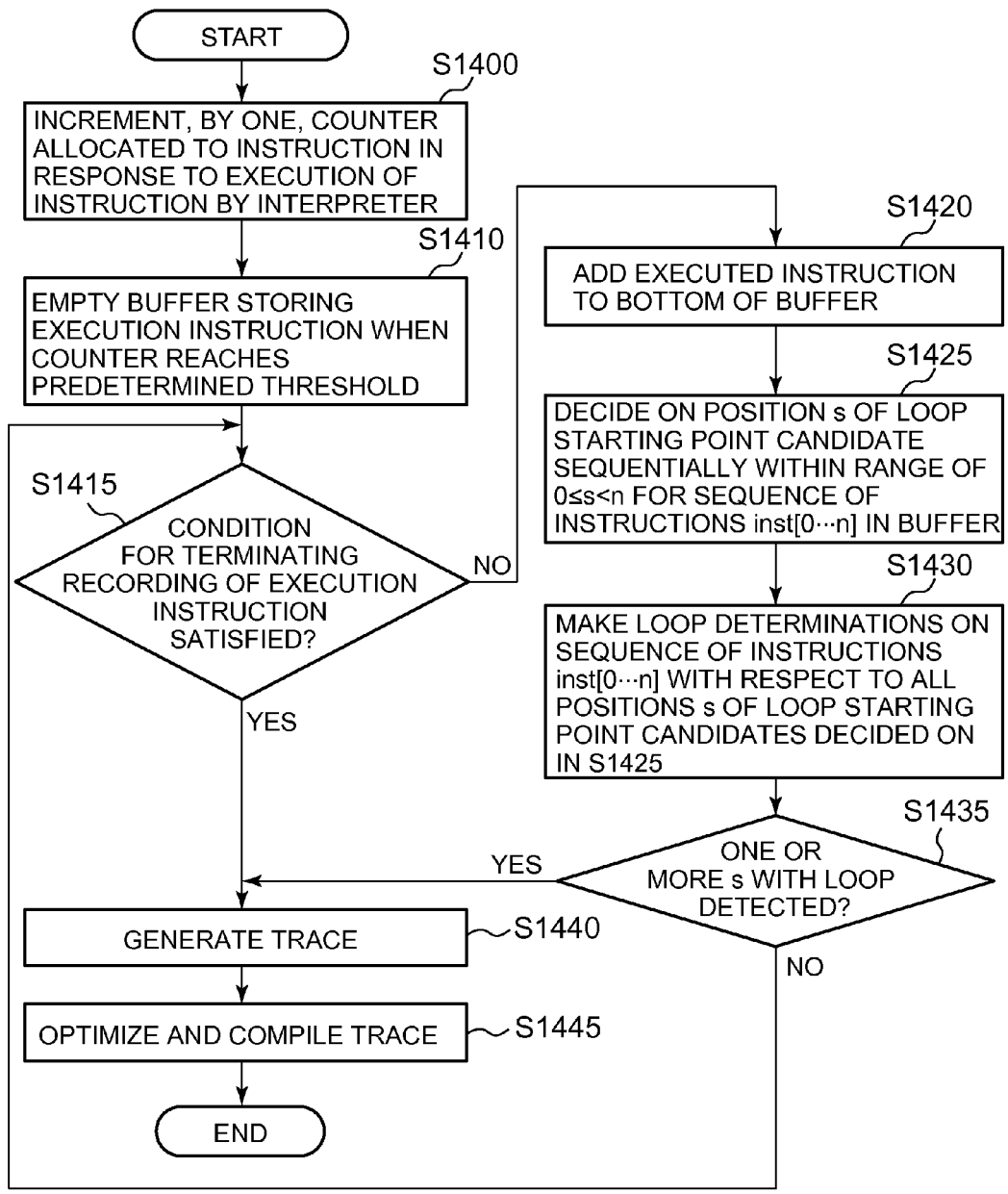
FIG. 14 is a flowchart showing an example of a flow of processing performed by a compiler 100a (or a compiler 100b and a tracing engine 150) shown in FIG. 1.

FIG. 14 is a flowchart showing a flow of compilation processing by the compiler 100a or the compiler 100b and the tracing engine 150. The processing starts at step 1400, in which the execution instruction recording section 110a of the compiler 100a or the execution instruction recording section 110b of the tracing engine 150 increments, by one, a counter allocated to an execution instruction in response to the execution of the instruction by an interpreter. Then, the execution instruction recording section 110a/b empties the storage section 105a/b (buffer) storing execution instructions when the counter reaches a predetermined threshold value (step 1410).

Then, the execution instruction recording section 110a/b determines whether a condition for terminating recording of the execution instruction is satisfied (step 1415). Here, the condition for terminating the recording of the execution instruction means a predetermined instruction recording termination condition such as that a loop is detected or that the buffer is filled up. If the condition for terminating the recording of the execution instruction has not been satisfied yet (NO in step 1415), the processing proceeds to step 1420, in which the execution instruction recording section 110a/b adds the executed instruction to the bottom of the storage section 105a/b (buffer).

Then, the processing proceeds to step 1425, in which the execution instruction recording section 110a/b decides on the position so fa loop starting point candidate sequentially within a range of 0≤s<n for each of a sequence of n+1 instructions inst[0 . . . n] stored in the storage section 105a/b (buffer). The decided position s of the loop starting point candidate is passed to the loop detection section 120a/b, and the loop detection section 120a/b makes a loop determination on the sequence of instructions inst[s . . . n] (step 1430). Since the details of the loop determination processing are already described with reference to FIG. 5 to FIG. 8 and FIG. 11 to FIG. 13, redundant description will be omitted here.

When loop determination results of all the positions s decided on by the execution instruction recording section 110a/b are obtained as the positions of the loop starting point candidates, the loop detection section 120a/b determines whether the number of positions s with a loop detected is one or more (step 1435). When the number of positions s with a loop detected is zero (NO in step 1435), the processing returns to step 1415 to repeat the sequence of processing steps.

On the other hand, when the number of positions s with a loop detected is one or more (YES in step 1435), or when it is determined in step 1415 that the condition for terminating the recording of the execution instruction recording is satisfied (YES in step 1415), the processing proceeds to step 1440, in which the trace generation section 130a/b generates a trace based on the sequence of instructions inst[s . . . n] determined to be a loop (step 1440). Then, the optimization section 140a/b optimizes and compiles the generated trace to generate native code (step 1445). After that, the processing is ended. Note that the generated native code is executed by the compiler 100a/b.

Referring next to FIG. 15, a trace to be generated by the trace generation section 130a/b will be described. The example shown in FIG. 15 shows a case where it is detected that a sequence of instructions inst[0 . . . n] is a loop with respect to position s=2 of a loop starting point candidate. The trace generated by the trace generation section 130a/b can be a trace 1500 without loop, a trace 1505 terminated before the loop, or a trace 1520 consisting of a trace 1510 without loop and a trace 1515 forming a loop. Thus, the trace generation section 130a/b generates a trace based on the loop determination result for the purpose of the entire processing system.

FIG. 16 is a table in which loop determination results obtained by the above-mentioned loop detection method according to the present invention are listed by taking code shown in FIG. 10B as an example. In FIG. 16, loop determination results by the conventional method are also listed for comparison. In the table, No FLF listed in Related Art indicates a conventional method for determining that a sequence of instructions is a loop on condition that the addresses of the first instruction and the last instruction in the sequence of instructions are the same. FLF no Return TRACE indicates a conventional method for prohibiting the generation of a trace including a return instruction from a function to which the first instruction of the trace is included.

Further, in the table, FLF call Stack listed in Present Invention indicates the loop detection method by the loop detection section 200 according to the first embodiment of the present invention. FLF no return LOOP indicates the loop detection method by the loop detection section 900 according to the second embodiment of the present invention. FLF two iterations indicates a loop detection method for determining that a sequence of instructions is a loop when it is detected that the sequence of instructions is repeated twice.

In the table shown in FIG. 16, loop determination results of five kinds of sequences of instructions obtained from the code shown in FIG. 10B and made by the respective methods are compared. Among the five kinds of sequences of instructions, the four kinds of sequences G-B-G, A-G-B-G, A-G-B-G-C-A, and G-B-G-C-A-G are the same sequences of instructions described with reference to FIG. 10A, and a framed rectangle of each sequence of instructions indicates a loop. The fourth sequence of instructions from the left, i.e., Non-loop trace with return from head indicates a trace of a sequence of instructions including a return from a function, to which the head of the loop belongs, but not being a loop. Since the sequence of instructions is not a loop, the determination result of the sequence of instructions is either "Permitted" or "Prohibited."

As shown in the table of FIG. 16, the determination results desired for all kinds of sequences of instructions are FLF call stack and FLF two iterations. However, since FLF two iterations detects a loop on condition that the sequence of instructions is repeated twice, it takes time to determine the loop, the total size of the trace becomes large, so that it can be said that FLF call stack is a preferable loop detection method.

Figure 17:
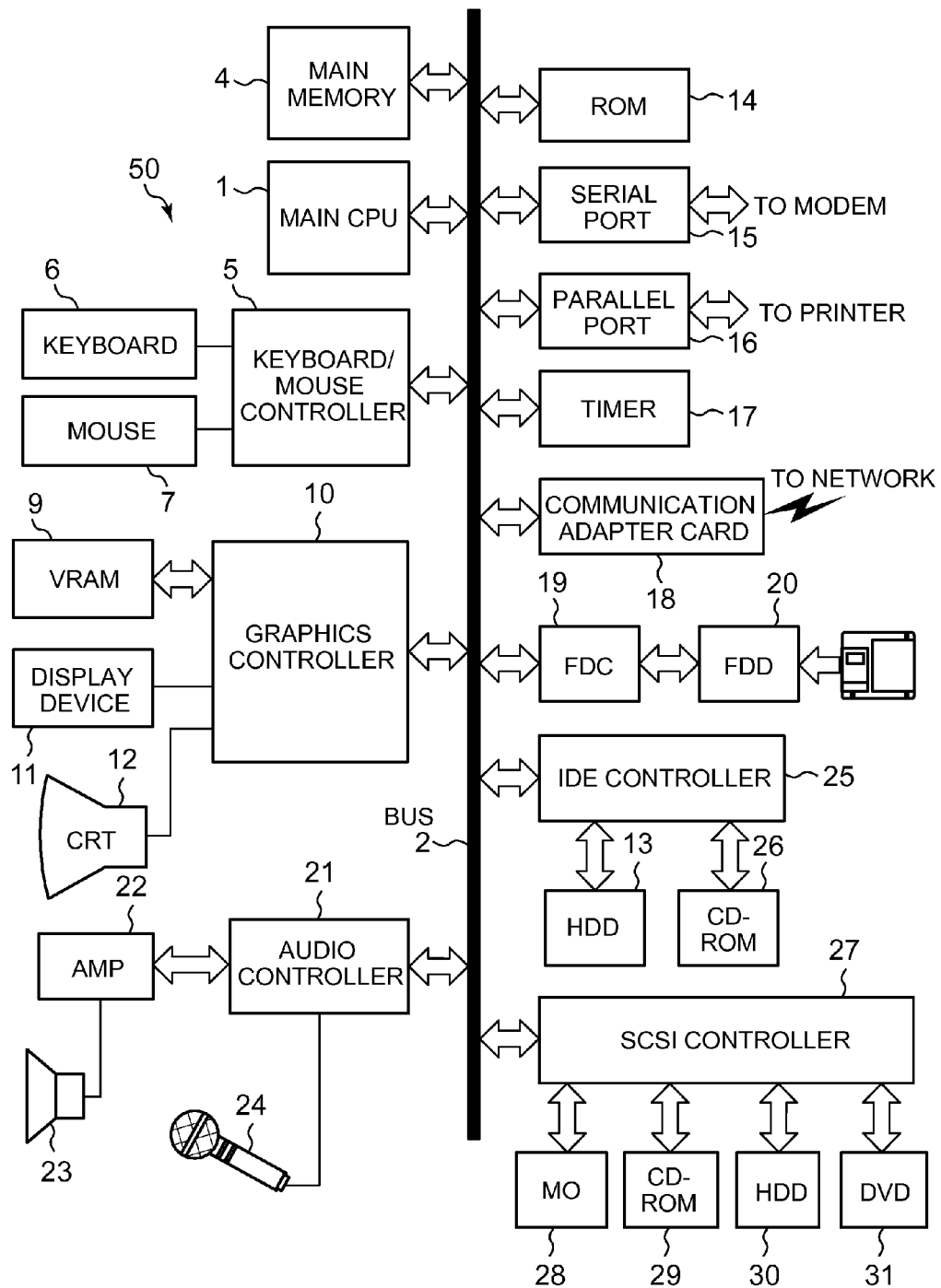
FIG. 17 shows an example of the hardware configuration of a computer 50 according to the embodiments of the present invention.

FIG. 17 is a diagram showing an example of the hardware configuration of a computer 50 for carrying out the present invention. The computer 50 includes a main CPU (central processing unit) 1 and a main memory 4, both of which are connected to a bus 2. Removable storages (external storage systems capable exchanging recording media), such as hard disk drives 13 and 30, CD-ROM drives 26 and 29, a flexible disk drive 20, an MO drive 28, and a DVD drive 31 are also connected to the bus 2 via a flexible disk controller 19, an IDE controller 25, and a SCSI controller 27.

Each of the storage media, such as a flexible disk, an MO, a CD-ROM, and a DVD-ROM, is inserted into each of the removable storages. These storage media, the hard disk drives 13, 30, and a ROM 14 can cooperate with an operating system to give instructions to the CPU and the like to enable recording of the code of a computer program for carrying out the present invention. In other words, a program installed on the computer 50 to cause the computer 50 to function as the loop detection section 200/900, the compiler 100a/b, or the tracing engine 150 can be recorded in the various storage devices mentioned above.

The program causing the computer 50 to function as the loop detection section 200 includes an address comparison module, a call stack comparison module, and a determination result output module. These modules work with the CPU 1 and the like to cause the computer 50 to function as the address comparing section 210, the call stack comparing section 220, and the determination result outputting section 240, respectively. The call stack comparison module further includes a TOPk calculation module and a call stack constructing module. These modules work with the CPU 1 and the like to cause the computer 50 to function as the TOPk calculation section 225 and the call stack constructing section 230, respectively.

The program causing the computer 50 to function as the loop detection section 900 includes an address comparing module, a return determination module, and a determination result outputting module. These modules work with the CPU 1 and the like to cause the computer 50 to function as the address comparing section 905, the return determination section 910, and the determination result outputting section 915, respectively.

The program causing the computer 50 to function as the compiler 100a includes a storage module, an execution instruction recording module, a call stack recording/constructing module, a loop detection module, a trace generation module, and an optimization module. These modules work with the CPU 1 and the like to cause the computer 50 to function as the storage section 105a, the execution instruction recording section 110a, the call stack recording/constructing section 115a, the loop detection section 120a, the trace generation section 130a, and the optimization section 140a, respectively.

The program causing the computer 50 to function as the compiler 100b includes a trace generation module and an optimization module. These modules work with the CPU 1 and the like to cause the computer 50 to function as the trace generation section 130b and the optimization section 140b, respectively. The program causing the computer 50 to function as the tracing engine 150 includes a storage module, an execution instruction recording module, a call stack recording/constructing module, and a loop detection module. These modules work with the CPU 1 and the like to cause the computer 50 to function as the storage section 105b, the execution instruction recording section 110b, the call stack recording/constructing section 115b, and the loop detection section 120b, respectively. Each of the computer programs can also be compressed or divided into two or more parts and recorded onto two or more media.

The computer 50 receives input from input devices such as a keyboard 6 and a mouse 7 via a keyboard/mouse controller 5. The computer 50 receives input from a microphone 24 via an audio controller 21 and outputs sound from a speaker 23. The computer 50 is connected to a display device 11 via a graphics controller 10 to present visual data to users. The computer 50 can be connected to a network through a network adapter 18 (an Ethernet® card or a token ring card) or the like to communicate with other computers and the like.

From the above, it will be readily understood that the computer 50 according to the embodiments can be implemented as a normal information processing apparatus, such as a personal computer, a workstation, and a mainframe computer, or a combination thereof. Note that the above-mentioned components are just illustrative and not all the components are the components essential for the present invention.

While the present invention is described above in connection with the embodiments, the technical scope of the present invention is not limited to the contents of the aforementioned embodiments. It will be apparent to those skilled in the art that various changes or modifications can be added to the aforementioned embodiments. Therefore, forms to which such changes or modifications are added can also be included in the technical scope of the present invention.

What is claimed is:

1. A loop detection method for determining whether a sequence of unit processes continuously executed among unit processes in a program is a loop by means of computational processing performed by a computer, the method comprising the steps of:

reading address information on the sequence of unit processes from a storage section of the computer;

comparing an address of a unit process as a loop starting point candidate with an address of a last unit process in the sequence of unit processes;

reading call stack information on the sequence of unit processes from the storage section of the computer;

comparing a call stack upon execution of the unit process as the loop starting point candidate with a call stack upon execution of the last unit process; and outputting a determination result indicating that the sequence of unit processes forms a loop if the respective comparison results of the addresses and the call stacks match with each other;

wherein at least one step is carried out by the computer device.

2. The loop detection method according to claim 1, wherein the comparison between the call stacks is a comparison between return addresses in respective stack frames that construct the call stacks.

3. The loop detection method according to claim 2, wherein the comparison between the return addresses in the respective stack frames is a comparison between respective return addresses from a stack frame last stacked to a k-th stack frame, wherein k is a given positive integer.

4. The loop detection method according to claim 3, wherein the given positive integer k is calculated as a smaller value between a value obtained by subtracting m from $k_1$ and a value obtained by subtracting m from $k_2$ if (i) a depth of a shallowest call stack in call stacks upon execution of respective unit processes in the sequence of unit processes is denoted by m, (ii) a depth of the call stack upon execution of the unit process as the loop starting point candidate is denoted by $k_1$, and (iii) a depth of the call stack upon execution of the last unit process is denoted by $k_2$.

5. The loop detection method according to claim 2, further comprising the steps of:

reading type information and address information on unit processes in the sequence of unit processes from the storage section of the computer;

constructing a call stack upon execution of the unit process as the loop starting point candidate and a call stack upon execution of the last unit process; and storing the call stacks in the storage section as information on the call stacks.

6. The loop detection method according to claim 5, wherein the type of information on unit processes is information indicating that each unit process is one of (i) a unit process on a caller side, (ii) a unit process on a callee side, and (iii) any other unit process.

7. The loop detection method according to claim 6, wherein the construction step of each call stack comprises a step of creating a branched link list by referring to the type information and address information on the unit processes in the sequence of unit processes, wherein the branch linked list comprises nodes, wherein each node represents a stack frame and has data fields.

8. The method according to claim 7, wherein the data fields are for recording (i) a return address in the represented stack frame and (ii) a reference link to a node representing the previous stack frame of the represented stack frame.

9. The method according to claim 8, wherein the construction step is performed such that a call stack upon execution of any unit process in the sequence of unit processes is constructed by sequentially tracing back nodes of previous stack frames from a node representing a stack frame corresponding to the unit process based on the reference and connecting return addresses of the nodes tracked back.

10. The loop detection method according to claim 1, wherein the unit process is selected from the group consisting of: (i) an instruction, (ii) a basic block, and (iii) a branch instruction.

11. The loop detection method according to claim 1, wherein the method further comprises the steps of:

deciding on each unit process in the sequence of unit processes sequentially as a unit process of the loop starting point candidate; and executing each step repeatedly each time the unit process is decided to be on.

12. The loop detection method according to claim 2, wherein the method further comprises the steps of:

counting the number of executions of each unit process;

starting to record the sequence of unit processes into the storage section of the computer when the number of executions reaches a predetermined value;

generating a trace of the sequence of unit processes based on a determination in response to output of the determination that the sequence of unit processes forms a loop;

optimizing the trace of the sequence of unit processes based on the determination in response to output of the determination that the sequence of unit processes forms a loop;

compiling the trace of the sequence of unit processes based on the determination in response to output of the determination that the sequence of unit processes forms a loop.

13. An article of manufacture tangibly embodying computer readable instructions which, when implemented, cause a computer to carry out the steps of the method according to claim 1.

14. A loop detection apparatus for determining whether a sequence of unit processes continuously executed among unit processes in a program forms a loop, the apparatus comprising:

a storage unit for storing address information and call stack information on the sequence of unit processes;

an address comparing unit for reading the address information on the sequence of unit processes from the storage section and comparing an address of a unit process as a loop starting point candidate with an address of a last unit process in the sequence of unit processes;

a call stack comparing unit for reading the call stack information on the sequence of unit processes from the storage section and comparing a call stack upon execution of the unit process as the loop starting point candidate with a call stack upon execution of the last unit process; and an output unit for outputting a determination result indicating that the sequence of unit processes forms a loop if respective comparison results of the addresses and the call stacks match with each other.

15. The loop detection apparatus according to claim 14, wherein the comparison between the call stacks is a comparison between return addresses in respective stack frames that construct the call stacks.

16. A loop detection apparatus for determining whether a sequence of unit processes continuously executed among unit processes in a program forms a loop, the apparatus comprising:

a storage unit for storing address information and type information on each of the unit processes in the sequence of unit processes;

an address comparing unit for reading the address information on the sequence of unit processes from the storage section and comparing an address of a unit process as a loop starting point candidate with an address of a last unit process in the sequence of unit processes;

a call stack constructing unit for reading the type information and address information on the unit processes from the storage section and constructing a call stack upon execution of the unit process as the loop starting point candidate and a call stack upon execution of the last unit process;

a call stack comparing unit for comparing the call stack upon execution of the unit process as the loop starting point candidate with the call stack upon execution of the last unit process; and an output unit for outputting a determination result indicating that the sequence of unit processes forms a loop if the respective comparison results of the addresses and the call stacks match with each other.

17. The loop detection apparatus according to claim 14, wherein the call stack constructing unit refers to the type information and address information on the unit processes in the sequence of unit processes to create a branched linked list, and wherein each record in the branched linked set represents a stack frame, and wherein each records a return address and reference link to a record representing the previous stack frame.

18. The loop detection apparatus according to claim 17, wherein each record sequentially tracks back, based on the reference, records of previous stack frames from a record representing a stack frame corresponding to a unit process to be determined and connects return addresses of the respective records to construct a call stack upon execution of the unit process.

19. An article of manufacture tangibly embodying computer readable non-transitory instructions which, when implemented, cause a computer to carry out the steps of the method according to claim 1.

20. An article of manufacture tangibly embodying computer readable non-transitory instructions which, when implemented, cause a computer to carry out the steps of the method according to claim 12.

* * * * *